United States Patent
Khoshnevis et al.

(10) Patent No.: US 9,197,385 B2
(45) Date of Patent: Nov. 24, 2015

(54) SYSTEMS AND METHODS FOR DEMODULATION REFERENCE SIGNAL SELECTION

(71) Applicant: Sharp Laboratories of America, Inc., Camas, WA (US)

(72) Inventors: Ahmad Khoshnevis, Portland, OR (US); Shohei Yamada, Camas, WA (US); Zhanping Yin, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 140 days.

(21) Appl. No.: 13/852,946

(22) Filed: Mar. 28, 2013

(65) Prior Publication Data

US 2014/0293881 A1 Oct. 2, 2014

(51) Int. Cl.
*H04W 4/00* (2009.01)
*H04L 5/00* (2006.01)

(52) U.S. Cl.
CPC .................... *H04L 5/0048* (2013.01)

(58) Field of Classification Search
None
See application file for complete search history.

(56) References Cited

U.S. PATENT DOCUMENTS

| | | | |
|---|---|---|---|
| 2011/0317615 A1 | 12/2011 | Soong et al. | |
| 2012/0213196 A1* | 8/2012 | Chung et al. | 370/330 |
| 2013/0022087 A1* | 1/2013 | Chen et al. | 375/147 |

FOREIGN PATENT DOCUMENTS

| | | |
|---|---|---|
| WO | 2011/160589 | 12/2011 |
| WO | 2012/023036 | 2/2012 |
| WO | 2012/064998 | 5/2012 |
| WO | 2013/168541 | 11/2013 |

OTHER PUBLICATIONS

3GPP TS 36.211 V9.0.0, Evolved Universal Terrestrial Radio Access (E-UTRA) Physical Channels and Modulation, (Release 9), Dec. 2012.
3GPP TS 36.212 V9.2.0, Evolved Universal Terrestrial Radio Access (E-UTRA) Multiplexing and Channel Coding, (Release 9), Jun. 2010.
3GPP TS 36.213 V9.1.0, Evolved Universal Terrestrial Radio Access (E-UTRA) Physical Layer Procedures, (Release 9), Mar. 2010.
3GPP TS 36.331 V9.1.0, Evolved Universal Terrestrial Radio Access (E-UTRA) Radio Resource Control (RRC), Protocol Specification, (Release 9), Dec. 2009.
Huawei, HiSilicon, "Analysis and Initial Evaluation Results for Overhead Reduction and Control Signaling Enchancements," 3GPP TSG-RAN WG1 Meeting #72, R1-130022, Feb. 2013.
Nokia Siemens Networks, Nokia, "On Uplink SU-MIMO Signaling," 3GPP TSG-RAN WG1 Meeting #60, R1-101435, Feb. 2010.
International Search Report issued for International Application No. PCT/JP2014/000062 on Apr. 1, 2014.

* cited by examiner

*Primary Examiner* — Afshawn Towfighi
(74) *Attorney, Agent, or Firm* — Austin Rapp & Hardman

(57) ABSTRACT

An evolved Node B (eNB) for demodulation reference signal (DMRS) selection is described. The eNB includes a processor and instructions stored in memory that is in electronic communication with the processor. The eNB determines a DMRS configuration based on a modulation and coding scheme (MCS). The eNB also determines downlink control information (DCI). The DCI includes signaling that indicates the DMRS configuration. The eNB further sends the DCI.

28 Claims, 15 Drawing Sheets

SYSTEMS AND METHODS FOR DEMODULATION REFERENCE SIGNAL SELECTION

TECHNICAL FIELD

The present disclosure relates generally to communication systems. More specifically, the present disclosure relates to systems and methods for demodulation reference signal (DMRS) selection.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
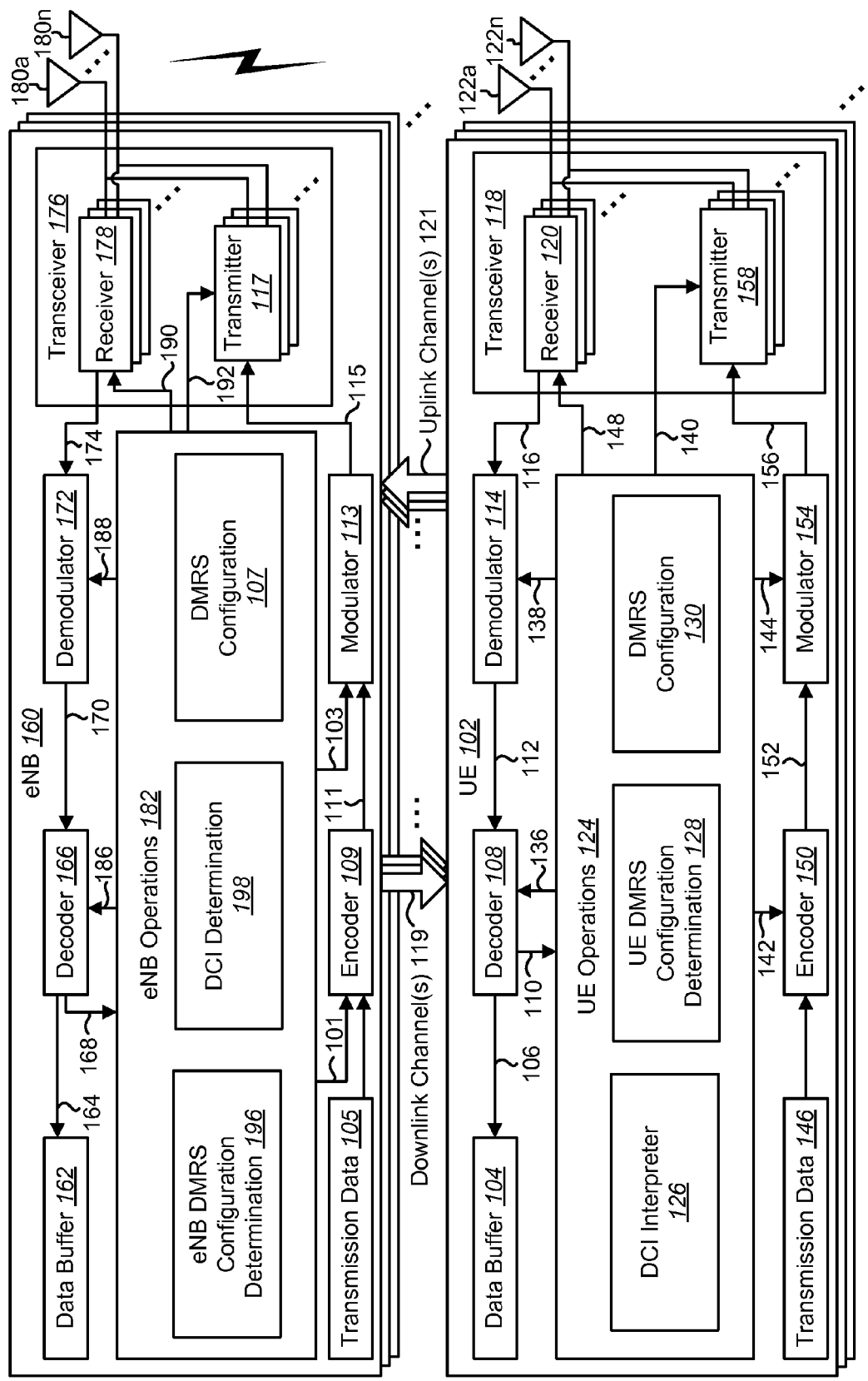
FIG. 1 is a block diagram illustrating one implementation of one or more evolved Node Bs (eNBs) and one or more User Equipments (UEs) in which systems and methods for DMRS selection may be implemented.

An eNB for DMRS selection is described. The eNB includes a processor and executable instructions stored in memory that is in electronic communication with the processor. The eNB determines a DMRS configuration based on a modulation and coding scheme (MCS). The eNB also determines downlink control information (DCI). The DCI includes signaling that indicates the DMRS configuration. The eNB further sends the DCI.

The DMRS configuration may be determined from among multiple DMRS configurations that differ in at least one or both of a DMRS pattern and a DMRS sequence symbol modulation order. Determining the DMRS configuration may include determining a DMRS configuration index based on the MCS. The DMRS configuration may be determined based on the DMRS configuration index.

Determining the DMRS configuration may include determining an MCS index and a number of physical resource blocks ($N_{PRB}$). The DMRS configuration may be determined based on the MCS index and the $N_{PRB}$.

The MCS index may be based on a single codeword associated with a single codeword transmission. The MCS index may be based on at least one of a first codeword and a second codeword associated with a multiple codeword transmission.

The signaling may include at least one of a DMRS configuration index, an MCS index and an $N_{PRB}$. The DCI may be a downlink (DL) assignment DCI corresponding to a physical downlink shared channel (PDSCH) transmission. The DCI may be an uplink (UL) assignment DCI corresponding to a physical uplink shared channel (PUSCH) transmission.

The eNB may also schedule a PUSCH transmission. The eNB may further receive a PUSCH transmission. The eNB may additionally estimate a channel based on the DMRS configuration. The eNB may also decode the PUSCH transmission based on the DMRS configuration.

A UE for DMRS selection is also described. The UE includes a processor and executable instructions stored in memory that is in electronic communication with the processor. The UE receives DCI. The UE also obtains signaling from the DCI that indicates a DMRS configuration. The DMRS configuration is based on an MCS. The UE further determines the DMRS configuration based on the signaling.

The DMRS configuration may be determined from among multiple DMRS configurations that differ in at least one or both of a DMRS pattern and a DMRS sequence symbol modulation order. Determining the DMRS configuration may include determining a DMRS configuration index based on the DCI. The DMRS configuration may be determined based on the DMRS configuration index.

Determining the DMRS configuration may include determining an MCS index and an $N_{PRB}$. The DMRS configuration may be determined based on the MCS index and the $N_{PRB}$.

The MCS index may be based on a single codeword associated with a single codeword transmission. The MCS index may be based on at least one of a first codeword and a second codeword associated with a multiple codeword transmission.

The signaling may include at least one of a DMRS configuration index, an MCS index and an $N_{PRB}$. The DCI may be a DL assignment DCI corresponding to a PDSCH transmission. The DCI may be an UL assignment DCI corresponding to a PUSCH transmission.

The UE may also encode a PUSCH transmission based on the DMRS configuration. The UE may further send the PUSCH transmission.

A method for DMRS selection by an eNB is also described. The method includes determining a DMRS configuration based on an MCS. The method also includes determining DCI. The DCI includes signaling that indicates the DMRS configuration. The method additionally includes sending the DCI.

A method for DMRS selection by a UE is also described. The method includes receiving DCI. The method also includes obtaining signaling from the DCI that indicates a DMRS configuration. The DMRS configuration is based on an MCS. The method further includes determining the DMRS configuration based on the signaling.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device (e.g., UE) and/or a base station (e.g., eNB).

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe demodulation reference signal selection. A communication device (e.g., a UE or an eNB) may include a receiver. In some implementations, the receiver may perform channel estimation in order to perform channel equalization on a received signal. The receiver may estimate a channel using reference signals. The reference signal used for demodulation may be referred to as a demodulation reference signal. The quality of the channel estimate depends on the number of symbols used for estimating the channel as well as the received signal-to-noise (SNR) ratio of the DMRS. Higher SNRs as well as larger numbers of received DMRS symbols may improve the channel estimation quality. The quality of a DMRS-based channel estimation may be measured either directly based on the accuracy of the estimation or indirectly by the impact of the DMRS on the probability of correct demodulation.

Furthermore, by applying adaptive coding and modulation (ACM), a transmitter may adjust the MCS (e.g., the coding rate and modulation order) according to the channel condition. For example, at low SNRs, the transmitter may reduce the coding rate and may use a lower modulation order. Conversely, at high SNRs, the transmitter may increase the coding rate and may use higher order modulations.

If a single DMRS with a fixed number of symbols and fixed transmit power is used, and the number of symbols and the transmit power is selected for a given channel condition or received SNR, e.g., the lowest SNR at which an adaptive coding and modulation is defined, which uses the lowest coding rate and modulation order, then at higher SNRs the performance of the DMRS may be much better than what is required. Therefore, this may result in excess power transmission and consumption or an unnecessary number of DMRS symbols, which may be removed and still satisfy the required performance. Moreover, the excess DMRS symbols are considered as overhead, which can be replaced by symbols carrying the application or other control data. Finally, the excess power/time/frequency resource usage of the DMRS symbols means that those resources might not be able to be re-used in a small area, limiting capacity per unit area.

Current solutions provide mechanisms to change the sequence of a DMRS to reduce interference, but no mechanism currently exists to reduce or increase the number of DMRS symbols. According to the systems and methods described herein, a DMRS configuration may change dynamically when data is transmitted. Therefore, the disclosed systems and methods describe dynamic DMRS selection, which may provide flexibility in the scheduling of communication devices. Furthermore, the disclosed systems and methods may reduce the overhead of control information, resulting in higher spectral efficiency and improved utilization of resources without sacrificing communication device performance.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope as claimed, but is merely representative of the systems and methods.

FIG. 1 is a block diagram illustrating one implementation of one or more eNBs 160 and one or more UEs 102 in which systems and methods for DMRS selection may be implemented. The one or more eNBs 160 communicate with one or more UEs 102 using one or more antennas 180a-n. For example, an eNB 160 transmits electromagnetic signals to the UE 102 and receives electromagnetic signals from the UE 102 using the one or more antennas 180a-n. The UE 102 communicates with the eNB 160 using one or more antennas 122a-n.

The eNB 160 and the UE 102 may use one or more channels 119, 121 to communicate with each other. For example, the one or more eNBs 160 may transmit information or data to the one or more UEs 102 using one or more downlink channels 119, for instance. Examples of downlink channels 119 include a PDCCH, an EPDCCH, a PDSCH, etc. A UE 102 may also transmit information or data to the eNB 160 using one or more uplink channels 121. Examples of uplink channels 121 include a physical uplink control channel (PUCCH) and a PUSCH, etc. Other kinds of channels may be used.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that the UE 102 may receive information from more than one eNB 160 or transmission point. Also, the transmitted information from a UE 102 may be received by more than one eNB 160 or reception point. Furthermore, the eNB(s) 160 that schedules the resources and provides configuration information may be different than the eNB 160 that transmits the DL control and application data information. Additionally, different eNB(s) 160 or reception points may receive the UE 102 information transmitted in the UL control or shared channel. In particular, the eNB 160 or transmission point that sends configuration information to the UE 102 (in this case the DMRS configuration 107) may be different than the eNB 160 or transmission point that transmits the DMRS in the DL, and a different eNB 160 or reception point may receive the DMRS transmitted by the UE 102 in the UL.

As used herein, a point (e.g., a transmission point or a reception point) may be a set of geographically co-located antennas. A point may also be referred to as a site. Points may be located on or connected to the same base station (e.g., eNB 160) or different base stations. Furthermore, UL transmissions by the UE 102 may be received by multiple points. Those points that transmit on the downlink to the UE 102 may be referred to as transmission points. Those points that receive transmissions on the uplink from a UE 102 may be referred to as reception points.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., downlink channel state information (DL-CSI)) that may be used by the eNB operations module 182 to perform one or more operations. It should be noted that it is possible to multiplex payload data or application data with control data. That is, a decoded signal may include payload data or application data as well as overhead data (e.g., control data).

As used herein, the term "module" may mean that a particular element or component may be implemented in hardware, software or a combination of hardware and software. However, it should be noted that any element denoted as a "module" herein may alternatively be implemented in hardware. For example, the eNB operations module 182 may be implemented in hardware, software or a combination of both.

In general, the eNB operations module 182 may enable the eNB 160 to communicate with the one or more UEs 102. The eNB operations module 182 may include one or more of an eNB DMRS configuration determination module 196, one or more DMRS configurations 107 and a DCI determination module 198. It should be noted that the eNB DMRS configuration determination module 196 may be in a different eNB 160 or transmission point than the eNB 160 or transmission point that transmits the DMRS configuration 107. In this case, the eNB 160 or transmission point with the eNB DMRS configuration determination module 196 may inform the eNB 160 or transmission point of the DMRS configuration 107.

The eNB DMRS configuration determination module 196 may determine a DMRS configuration 107 based on an MCS. The MCS may include the modulation order and the coding rate of a transmission (e.g., a PDSCH or PUSCH transmission).

The modulation order ($Q_m$) may be defined as the number of modulated symbols in a modulation scheme. The coding rate may be defined by a ratio of k/n, in which n is the number of coded bits generated by applying a coding algorithm to the k uncoded bits.

The MCS of the eNB 160 may change. In one implementation, the eNB 160 may determine the MCS based on DL-CSI, which may be received from the UE 102. The eNB 160 may additionally or alternatively determine the MCS based on one or more other factors, which may include a DL frame error rate and quality of service (QoS).

The eNB DMRS configuration determination module 196 may determine a DMRS configuration 107 from among multiple DMRS configurations 107. As described above, a DMRS is a reference signal that may be used for a channel estimate associated with demodulation. The quality of a channel estimate depends on the number of symbols used for estimating the channel as well as the received signal-to-noise (SNR) ratio of the DMRS. Higher SNRs as well as larger numbers of received DMRS symbols may improve the channel estimation quality. Therefore, the eNB 160 may change the number of DMRS symbols based on the MCS.

Figure 4:
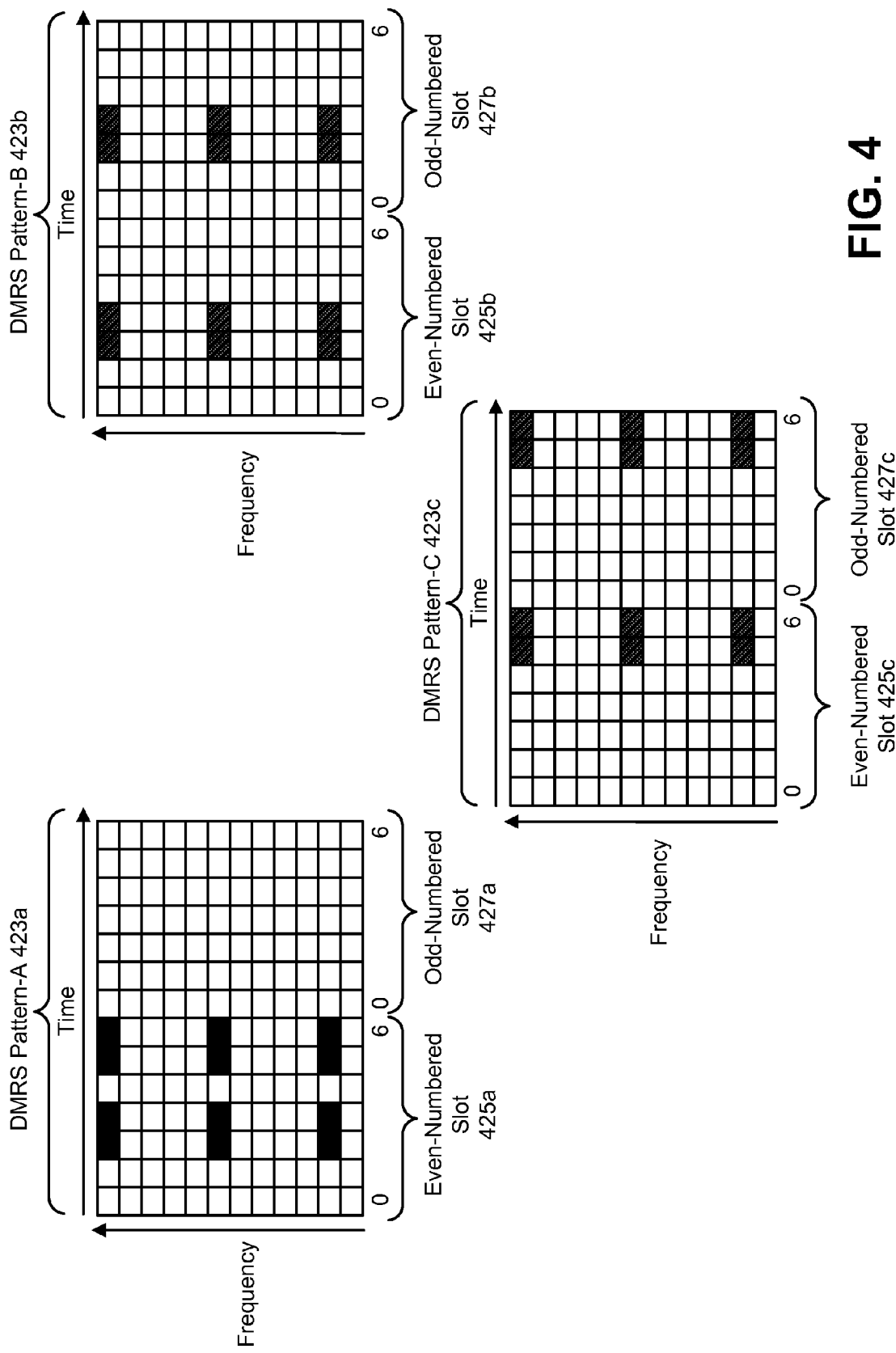
FIG. 4 is a block diagram illustrating examples of DMRS patterns.
Figure 5:
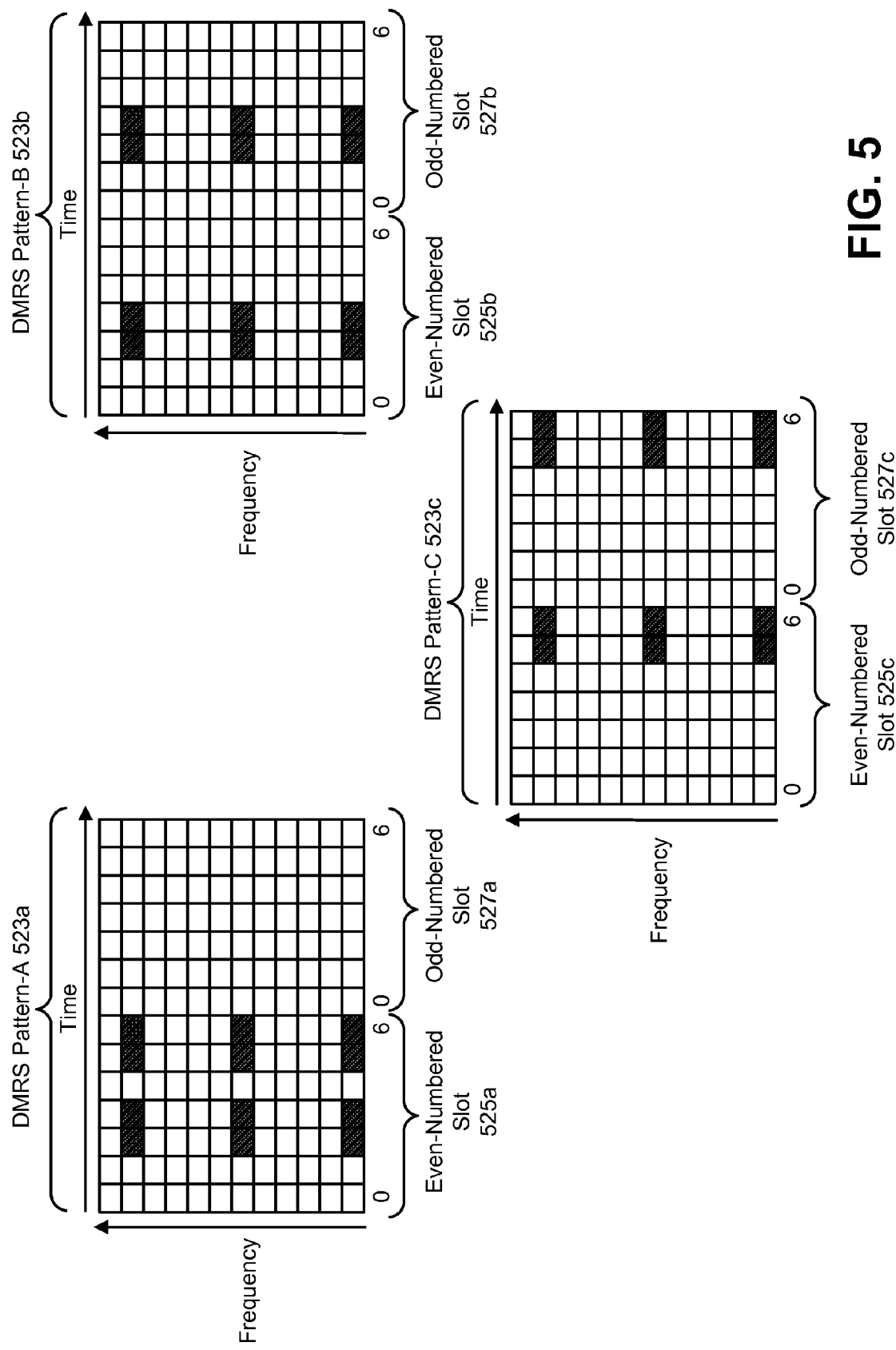
FIG. 5 is a block diagram illustrating additional examples of DMRS patterns.
Figure 6:
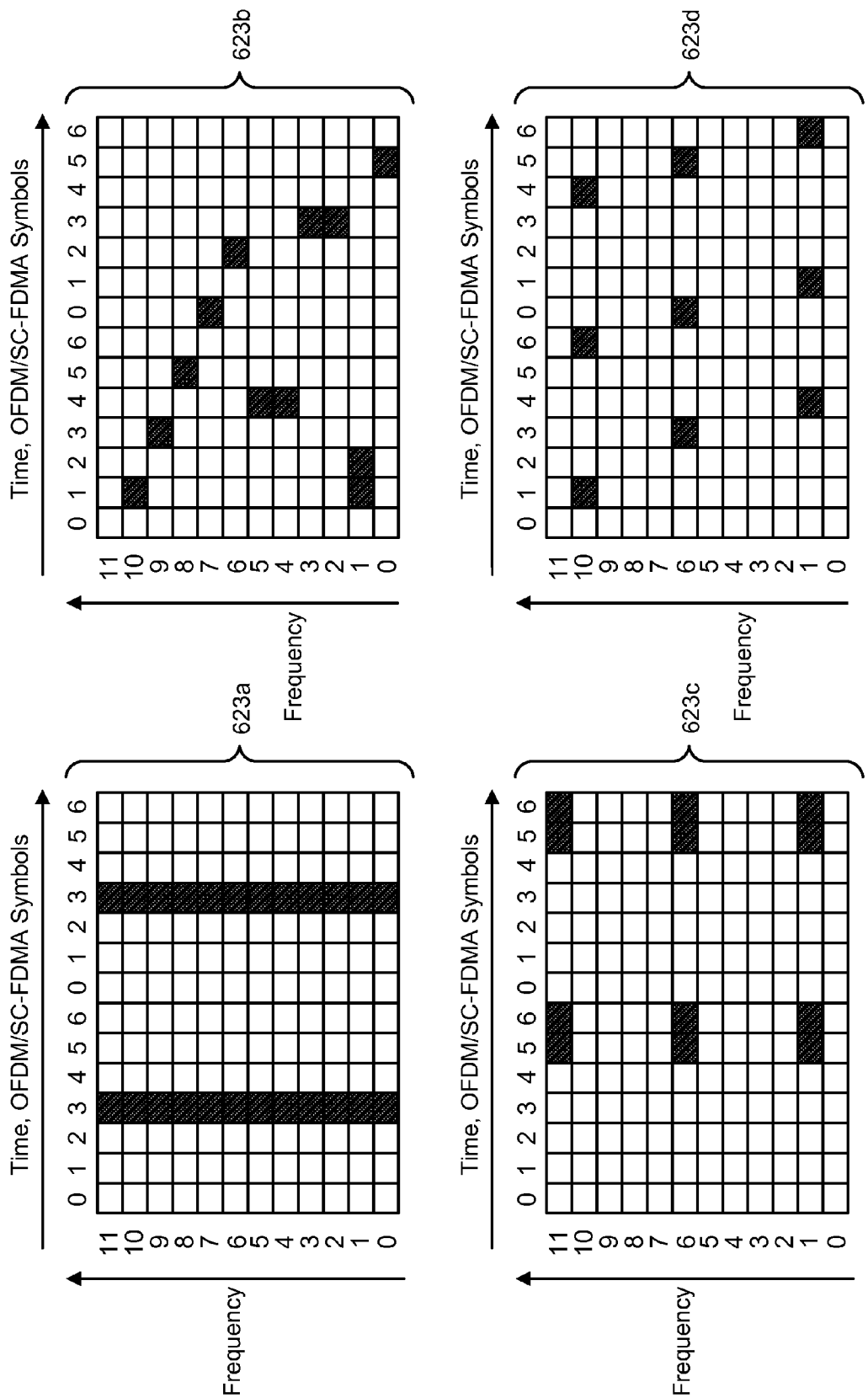
FIG. 6 is a block diagram illustrating further examples of DMRS patterns.

A DMRS configuration 107 may include parameters used to generate a DMRS sequence. Each DMRS configuration 107 may differ in at least a DMRS pattern or a DMRS sequence symbol modulation order when DMRS sequence symbols are selected from a set of modulation symbols, e.g. quadrature phase shift keying (QPSK) symbols. For example, the DMRS configuration may be determined from among multiple DMRS configurations that differ in at least one or both of a DMRS pattern and a DMRS sequence symbol modulation order. A DMRS pattern may be defined as the resource elements occupied by the DMRS symbols. Various examples of DMRS patterns are illustrated in FIGS. 4-6. A DMRS pattern may also be referred to as a DMRS resource element pattern. The DMRS pattern may indicate the number of symbols allocated for transmission of a codeword (in rate matching) associated with a PDSCH transmission. Additionally or alternatively, the DMRS pattern may indicate the location of punctured symbols.

In one implementation, the DMRS configuration 107 may be determined by the eNB DMRS configuration determination module 196 based on parameters associated with the MCS. One parameter may be an MCS index ($I_{MCS}$). The MCS may be represented by the $I_{MCS}$. It should be noted that in 3GPP specifications the MCS might also refer to $I_{MCS}$.

Another parameter that may be used to determine the DMRS configuration 107 is the $N_{PRB}$. For example, the eNB 160 may determine the $N_{PRB}$ allocated for a DL transmission of a shared channel (e.g., PDSCH) to the UE 102. The $I_{MCS}$ and $N_{PRB}$ completely define the MCS. It should be noted that in general, the $I_{MCS}$ is an index that is used to determine the MCS.

In one implementation, the eNB DMRS configuration determination module 196 may determine the DMRS configuration 107 directly from the $I_{MCS}$ and $N_{PRB}$. For example, the $I_{MCS}$ and $N_{PRB}$ may be entries in a lookup table that indicates the DMRS configuration 107, as described in more detail in connection with FIG. 2 below. In another implementation, the eNB DMRS configuration determination module 196 may determine a DMRS configuration index ($I_{DMRS}$) based on the $I_{MCS}$ and $N_{PRB}$. Upon determining the $I_{DMRS}$, the eNB DMRS configuration determination module 196 may determine the DMRS configuration 107.

The eNB DMRS configuration determination module 196 may determine the DMRS configuration 107 based on the transmission of single codewords or the transmission of multiple codewords. In the case of multiple code words, the eNB DMRS configuration determination module 196 may determine the DMRS configuration 107 based on the MCS index of one of the codewords, as described below in more detail.

The DCI determination module 198 may determine DCI. The DCI may be sent to the UE 102. The DCI may be sent in packets of pre-specified length, which may be referred to in the singular (e.g., a DCI). A PDCCH or enhanced physical downlink control channel (EPDCCH) may carry a DCI. Different DCIs may carry different information. For example, one DCI may be used to inform UEs 102 about downlink resource allocation and another DCI may be used to inform a specific UE 102 about uplink resource allocation, etc. Therefore, depending on the functionality of a DCI, different DCIs with different functionality may have different lengths. Different DCIs may be distinguished by the way they are formatted and coded, which may be referred to as DCI formats. A DCI may transport downlink or uplink scheduling information, requests for aperiodic channel quality indicator (CQI) reports, notifications of a multicast control channel (MCCH) change or uplink power control commands for one cell and one RNTI (Radio Network Temporary Identifier). The RNTI may be implicitly encoded in the cyclic redundancy check (CRC).

The DCI may vary depending on whether a transmission is a downlink transmission or an uplink transmission. For example, for a DL transmission, the DCI may be a DL assignment DCI, which may indicate, among other things, the resources and configurations used for transmission of data in the PDSCH. Therefore, the DL assignment DCI may include the $I_{MCS}$ of the PDSCH. For an uplink transmission, the DCI may be a UL assignment DCI, which may indicate, among other things, the resources and configurations used for transmission of data in the PUSCH. Therefore, the UL assignment DCI may include the $I_{MCS}$ of the PUSCH.

The DCI may also include signaling that indicates the DMRS configuration 107. In one implementation, the signaling may include the $I_{MCS}$ or the $N_{PRB}$ or both the $I_{MCS}$ and the $N_{PRB}$ for the transmission. In another implementation, the signaling may include the $I_{DMRS}$.

The eNB operations module 182 may provide information 190 to the one or more receivers 178. For example, the eNB operations module 182 may inform the receiver(s) 178 when or when not to receive PUSCH information.

The eNB operations module 182 may provide information 188 to the demodulator 172. For example, the eNB operations module 182 may inform the demodulator 172 of a modulation pattern anticipated for transmissions from the UE(s) 102. The PUSCH information received from a UE 102 may be demodulated based on the DMRS configuration 107.

The eNB operations module 182 may provide information 186 to the decoder 166. For example, the eNB operations module 182 may inform the decoder 166 of an anticipated encoding for transmissions from the UE(s) 102. The PUSCH information received from a UE 102 may be decoded based on the DMRS configuration 107.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101. In some implementations, the other information may include a DCI.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on the DMRS configuration 107. The one or more transmitters 117 may upconvert and transmit the modulated signal(s) 115 to one or more UEs 102.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

In general, the UE operations module 124 may enable the UE 102 to communicate with the one or more eNBs 160. The UE operations module 124 may include one or more of a DCI interpreter 126, a UE DMRS configuration determination module 128 and one or more DMRS configurations 130.

The DCI interpreter 126 may receive a DCI, which may be sent from the eNB 160. The DCI interpreter 126 may obtain signaling from the DCI that indicates a DMRS configuration 130. As described above, the DCI may be a DL assignment DCI associated with a DL transmission or a UL assignment DCI associated with a UL transmission. In one implementation, the signaling may include the $I_{MCS}$ or the $N_{PRB}$ or both the $I_{MCS}$ and the $N_{PRB}$ for the transmission. In another implementation, the signaling may include the $I_{DMRS}$. The signaling may indicate a DMRS configuration 130 for the UE 102 that corresponds to the DMRS configuration 130 determined by the eNB 160.

The UE DMRS configuration determination module 128 may determine the DMRS configuration 130 based on the signaling obtained from the DCI. In one implementation, the UE DMRS configuration determination module 128 may determine the DMRS configuration 130 directly from the $I_{MCS}$ and $N_{PRB}$. For example, $I_{MCS}$ and $N_{PRB}$ may be entries in a lookup table that indicates the DMRS configuration 130, as described in more detail below. In another implementation, the UE DMRS configuration determination module 128 may determine an $I_{DMRS}$ based on the $I_{MCS}$ and $N_{PRB}$. Upon determining $I_{DMRS}$, the UE DMRS configuration determination module 128 may determine the DMRS configuration 130. In yet another implementation, the UE DMRS configuration determination module 128 may determine the DMRS configuration 130 directly from an $I_{DMRS}$ that may be obtained from the DCI.

The UE operations module 124 may provide information 148 to the one or more receivers 120. For example, the UE operations module 124 may inform the receiver(s) 120 when to receive transmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158.

For example, the UE operations module 124 may instruct the one or more transmitters 158 when to transmit a signal to the eNB 160.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated (LSI) circuit or integrated circuit, etc.

Figure 2:
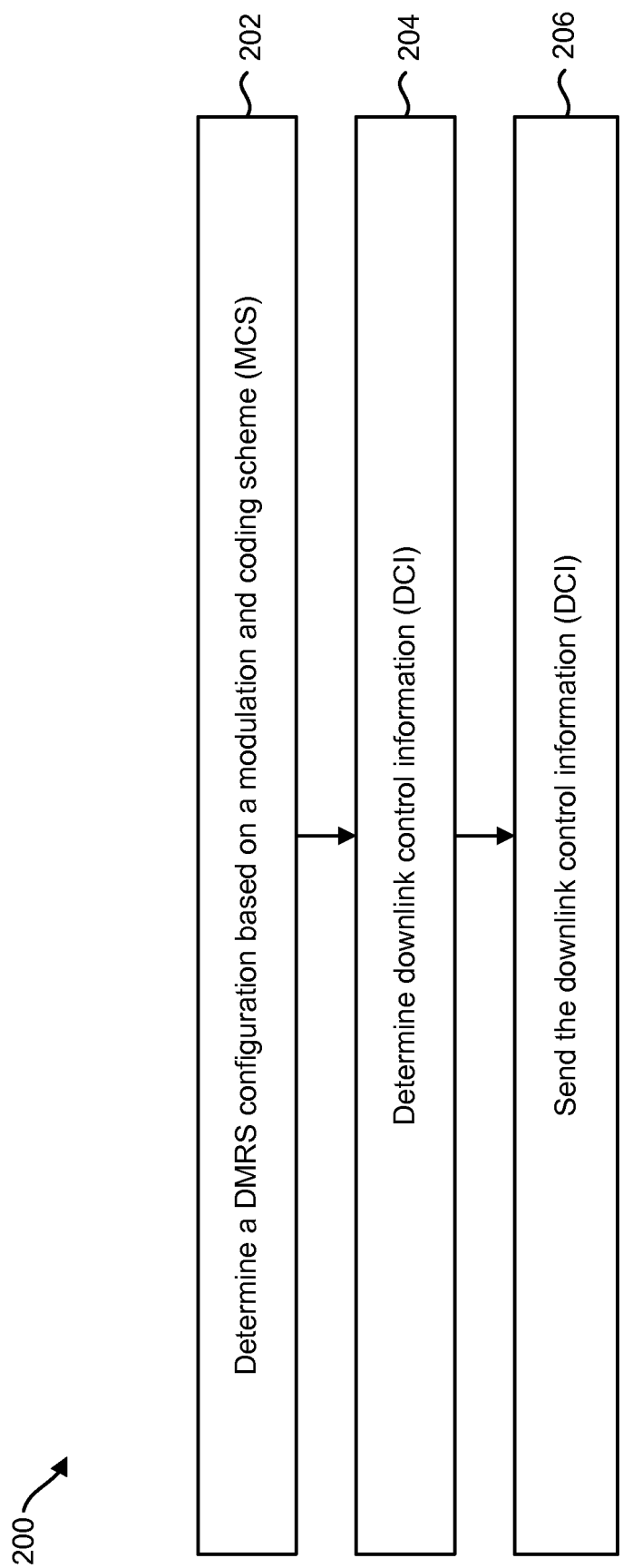
FIG. 2 is a flow diagram illustrating one implementation of a method for determining a DMRS by an eNB.

FIG. 2 is a flow diagram illustrating one implementation of a method 200 for determining a DMRS by an eNB 160. The eNB 160 may determine 202 a DMRS configuration 107 based on an MCS. For example, if ACM is used, the eNB 160 may change the coding rate and modulation order (e.g., the MCS) according to DL-CSI. For instance, the eNB 160 may select an appropriate MCS for a transmission based on a DL-CSI received from the UE 102. The eNB 160 may additionally or alternatively determine the MCS based on one or more other factors, which may include DL frame error rate and quality of service (QoS). The eNB 160 may determine 202 a DMRS configuration 107 based on the MCS. Because the MCS may change, the DMRS configuration 107 may also change. The MCS may be represented by an $I_{MCS}$.

The eNB 160 may also determine an $N_{PRB}$. In one implementation, the $N_{PRB}$ may correspond to the number of resource blocks allocated for a DL transmission (e.g., PDSCH) to the UE 102. In another implementation, the $N_{PRB}$ may correspond to the number of resource blocks allocated for a UL transmission (e.g., PUSCH) from the UE 102 to the eNB 160.

The $I_{MCS}$ and $N_{PRB}$ may completely define the modulation and coding scheme (MCS). For example, the $I_{MCS}$ may indicate a modulation order for a PDSCH transmission as illustrated in Table (1) below.

TABLE (1)

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |

TABLE (1)-continued

| MCS Index $I_{MCS}$ | Modulation Order $Q_m$ | TBS Index $I_{TBS}$ |
|---|---|---|
| 26 | 6 | 24 |
| 27 | 6 | 25 |
| 28 | 6 | 26 |
| 29 | 2 | reserved |
| 30 | 4 | |
| 31 | 6 | |

In Table (1), the modulation order for a PDSCH transmission may be determined based on the $I_{MCS}$. Furthermore, the $I_{MCS}$ may indicate a modulation order for a PUSCH transmission as illustrated in Table (2) below. In particular, Table (2) illustrates a modulation, TBS index and redundancy version table for PUSCH transmissions.

TABLE (2)

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

In Table (2), $rv_{idx}$ is the redundancy version of a transmitted codeword. The redundancy version index 0 is used for initial transmission. The redundancy version indicates the way coded bits are ordered at the output of the encoder 109 in order to form a codeword.

The modulation order may be defined as the number of modulated symbols in a modulation scheme. The modulation order may be based on the number of bits that are mapped into a modulated symbol. For example, quadrature phase shift keying (QPSK) modulation is of order 4, since there are 4 symbols in a QPSK modulation scheme. The QPSK modulation maps two binary bits into a modulated symbol. Therefore, QPSK has order of $2^2=4$. Similarly, 16-Quadrature Amplitude Modulation (QAM) maps 4 bits into a modulation symbol. Therefore, 16-QAM has an order of $2^4=16$.

Four bits are needed to represent the $I_{MCS}$ for identifying entries in Table (1) and Table (2) above. Higher order modulations may also be used. For example, 256-QAM may be used with $Q_m=8$. In this case, either the same 4 bits of $I_{MCS}$ are used, but the entries of Table (1) and Table (2) above are modified to accommodate for the higher order modulation (e.g., 256-QAM), or additional bits are used to identify the $Q_m$ and Therefore, as used herein, $I_{MCS}$ contains all the bits and information to identify $Q_m$ and $I_{TBS}$. For example, one bit in the DCI or in Radio Resource Control (RRC) information may be used to indicate whether 256-QAM is supported or not, and a combination of that bit with four bits of $I_{MCS}$ in the DCI determines the MCS.

A transport block size (TBS) index ($I_{TBS}$) may also be determined based on the $I_{MCS}$ as illustrated in Table (1) for PDSCH and Table (2) for PUSCH. In some implementations, the eNB 160 may change the coding rate by changing the TBS. The TBS may represent the size (e.g., number of bits) of a transport block, which is the data that is delivered to the physical layer on a transport channel (e.g., PDSCH). Data may arrive at the encoder 109 (e.g., coding unit) in the form of a maximum of two transport blocks. Therefore, the TBS may indicate the number of uncoded bits to enter the encoder 109. It should be noted that each transport block may have its own $I_{TBS}$ and $I_{MCS}$.

The encoder 109 may have one input, which is an uncoded bit stream, and may have more than one output. The encoder 109 may encode the uncoded bits into v coded bits. The coding unit may perform several functionalities including encoding, interleaving the coded bits and bit selection (which is how the bits at the output may be selected to form a stream of coded bits, for example).

The eNB 160 may allocate a number of resource elements for transmission of data. A resource element may be the smallest time-frequency resource unit for uplink/downlink transmissions. One resource element may have a bandwidth equal to a subcarrier and time duration equal to an orthogonal frequency division multiplexed (OFDM)/single-carrier frequency division multiple access (SC-FDMA) symbol. The complex-valued modulation symbols for each of the codewords to be transmitted may be mapped onto one or several layers. After layer mapping and precoding mapping, for each of the antenna 180 ports used for transmission of the physical channel, a block of complex-valued modulation symbols may be mapped to resource elements. The modulation order determines the number of coded bits that are mapped to each complex-valued modulation symbol.

The modulation order, number of layers and number of resources allocated for a transmission of data may determine the number of coded bits. As described above, the TBS defines the number of bits of input for the encoder 109. TBS may be determined as illustrated in Table (3).

In Table (3), the TBS (e.g., the number of bits of a transport block) may be determined based on $I_{TBS}$ and $N_{PRB}$. For a PDSCH transmission, $I_{TBS}$ may be determined as illustrated in Table (1) above. For a PUSCH transmission, $I_{TBS}$ may be determined as illustrated in Table (2) above.

Upon determining the MCS, the eNB 160 may determine 202 the DMRS configuration 107 based the $I_{MCS}$ and $N_{PRB}$. The DMRS configuration 107 may include one or a combination of DMRS sequences. For example, a DMRS configuration 107 may include parameters needed to generate a DMRS sequence. The DMRS configuration 107 parameters may include a parameter (e.g., $n_{ID}$) to initiate a pseudo random number generator algorithm (or a pseudo random number generating module). For instance, $n_{ID}$ is the parameter that is used to initialize the pseudo random number generating module.

In one implementation, pseudo-random sequences may be defined by a length-31 Gold sequence. The output sequence c(n) of length $M_{PN}$, where n=0, 1, ..., $M_{PN}-1$, may be defined by equations (1)-(3).

$$c(n)=(x_1(n+N_C)+x_2(n+N_C)) \bmod 2 \quad (1)$$

$$x_1(n+31)=(x_1(n+3)+x_1(n)) \bmod 2 \quad (2)$$

$$x_2(n+31)=(x_2(n+3)+x_2(n+2)+x_2(n+1)+x_2(n)) \bmod 2 \quad (3)$$

In equation (1), $N_C=1600$ and the first m-sequence may be initialized with $x_1(0)=1$, $x_1(n)=0$, $n=1, 2, \ldots, 30$. The initialization of the second m-sequence is denoted by $c_{init}=\Sigma_{i=0}^{30} x_2(i) \cdot 2^i$ with the value depending on the application of the sequence. The pseudo-random sequence generator may be initialized with $c_{init}=(\lfloor n_s/2 \rfloor+1) \cdot (2n_{ID}^{(nSCID)}+1) \cdot 2^{16}+n_{SCID}$ at the start of each subframe. The quantities $n_{ID}^{(i)}$, i=0,1, are given by $n_{ID}^{(i)}=n_{ID}^{cell}$ if no value for $n_{ID}^{DMRS,i}$ is provided by higher layers or if DCI format 1A is used for the DCI associated with the PDSCH transmission. Otherwise, $n_{ID}^{(i)}=n_{ID}^{DMRS,i}$. In one example, the DMRS configuration 107 parameters may include parameters $n_{ID}^{DMRS,i}$.

The DMRS configuration 107 parameters may also include a DMRS pattern (e.g., the time and/or frequency resources allocated for transmission of DMRS symbols). The DMRS configuration 107 parameters may further include the one or more antenna ports to be used for transmission of the DMRS. The DMRS configuration 107 parameters may additionally include parameters used for generating a scrambling sequence (e.g., a parameter to initialize a pseudo random number generating module).

In some implementations, the DMRS configuration 107 may be determined 202 using $I_{MCS}$ and $N_{PRB}$ as entries in a lookup table. $I_{MCS}$ and $N_{PRB}$ may indicate rows and columns

TABLE (3)

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 | of a lookup table in which the entry of the table is a DMRS configuration 107. For example, a DMRS configuration 107 may be mapped to $I_{MCS}$ and $N_{PRB}$ as illustrated in Table (4).

TABLE (4)

| $I_{MCS}$ | $N_{PRB}$ | | | |
|---|---|---|---|---|
| | 1 | 2 | 3 | ... |
| 0 | DMRS Config 1 | DMRS Config 2 | DMRS Config 3 | ... |
| 1 | DMRS Config 4 | DMRS Config 5 | DMRS Config 6 | ... |
| ... | ... | ... | ... | ... |

In Table (4), the term "DMRS Config" refers to a particular DMRS configuration 107. As described above, each of the DMRS configurations 107 may differ in at least one or both of a DMRS pattern and a DMRS sequence symbol modulation order. It should be noted that the DMRS configuration 107 mapping illustrated in Table (4) is just one example of possible mappings. Furthermore, there may be more entries for $I_{MCS}$, $N_{PRB}$ and DMRS Config than is illustrated in Table (4).

In another implementation, the DMRS configuration 107 may be determined 202 by mapping $I_{MCS}$ and $N_{PRB}$ to a DMRS configuration index (e.g., $I_{DMRS}$). For example, $I_{DMRS}$ may be mapped to $I_{MCS}$ and $N_{PRB}$ as illustrated in Table (5).

TABLE (5)

| $I_{MCS}$ | $N_{PRB}$ | | | |
|---|---|---|---|---|
| | 1 | 2 | 3 | ... |
| 0 | $I_{DMRS} = 1$ | $I_{DMRS} = 2$ | $I_{DMRS} = 3$ | ... |
| 1 | $I_{DMRS} = 4$ | $I_{DMRS} = 5$ | $I_{DMRS} = 6$ | ... |
| ... | ... | ... | ... | ... |

In Table (5), $I_{DMRS}$ is assigned a value based on $I_{MCS}$ and $N_{PRB}$. It should be noted that the $I_{DMRS}$ mapping illustrated in Table (5) is just one example of possible mappings. Furthermore, there may be more entries for $I_{MCS}$, $N_{PRB}$ and $I_{DMRS}$ than is illustrated in Table (5). Upon determining $I_{DMRS}$ according to Table (5), the DMRS configuration 107 may be determined 202 as illustrated in Table (6).

TABLE (6)

| $I_{DMRS}$ | DMRS Configuration |
|---|---|
| 1 | DMRS Config 1 |
| 2 | DMRS Config 2 |
| 3 | DMRS Config 3 |
| 4 | DMRS Config 4 |
| 5 | DMRS Config 5 |
| 6 | DMRS Config 6 |
| ... | ... |

The DMRS configuration 107 may be determined 202 for a single or multiple codeword transmission on the PDSCH or PUSCH. In the case of a single codeword transmission, the DMRS configuration 107 may be determined 202 as described above. In the case when multiple codewords are scheduled for a PDSCH or PUSCH transmission, both codewords share the same resource blocks. Therefore, the $N_{PRB}$ parameter for a first codeword is the same as the $N_{PRB}$ parameter for a second codeword. An $I_{MCS}$ for the multiple codewords may be determined from a DCI format. The $I_{MCS}$ of the first codeword ($I_{MCS,CW0}$) may or may not equal the $I_{MCS}$ of the second codeword ($I_{MCS,CW1}$). In one implementation, if $I_{MCS,CW0}$ and $I_{MCS,CW1}$ are not equal, then the eNB 160 may always use one of $I_{MCS,CW0}$ or $I_{MCS,CW1}$ to determine 202 the DMRS configuration 107. In another implementation, if $I_{MCS,CW0}$ and $I_{MCS,CW1}$ are not equal, then the eNB 160 may use the minimum value of $I_{MCS,CW0}$ and $I_{MCS,CW1}$ (e.g., min ($I_{MCS,CW0}$, $I_{MCS,CW1}$)). In yet another implementation, if $I_{MCS,CW0}$ and $I_{MCS,CW1}$ are not equal, then the eNB 160 may use the maximum value of $I_{MCS,CW0}$ and $I_{MCS,CW1}$ (e.g., max ($I_{MCS,CW0}$, $I_{MCS,CW1}$)).

The eNB may determine 204 DCI. A PDCCH or enhanced physical downlink control channel (EPDCCH) may carry a DCI. Different DCI may carry different information. For example, one type of DCI may be used to inform UEs 102 about downlink resource allocation and another type of DCI may be used to inform a specific UE 102 about uplink resource allocation, etc. Therefore, depending on the functionality of the DCI, different DCI with different functionality may have different lengths. Different DCI may be distinguished by the way the DCI is formatted and coded, which may be referred to as a DCI format.

The DCI may vary depending on whether a transmission is a downlink transmission or an uplink transmission. For example, for a downlink transmission, the DCI may be a DL assignment DCI, which may indicate, among other things, the resources and configurations used for transmission of data in the PDSCH. The DL assignment DCI may also be referred to as a DL resource assignment, a DL assignment, and/or a DL grant. The DL assignment DCI may include the $I_{MCS}$ of the PDSCH.

For an uplink transmission, the DCI may be a UL assignment DCI, which may indicate, among other things, the resources and configurations used for transmission of data in the PUSCH. The UL assignment DCI may include the $I_{MCS}$ of the PUSCH. The UL assignment DCI may also be referred to as a UL resource assignment, a UL assignment, and/or a UL grant. Among other things, the UL assignment DCI may indicate the MCS that should be used by the UE 102, as well as the resources (including the resource elements or resource blocks) that should be used for UL transmission of data on the PUSCH.

The DCI may also include signaling that indicates the DMRS configuration 107. In one implementation, the signaling may include one of the $I_{MCS}$ or the $N_{PRB}$ or both for a transmission. In another implementation, the signaling may include the $I_{DMRS}$.

In one alternative implementation, the DCI may include an $I_{DMRS}$ field to signal the DMRS configuration 107 to the UE 102. In the case of a DL transmission, the $I_{DMRS}$ field in the DL assignment DCI may be set to the value corresponding to the value of $I_{DMRS}$. Therefore, the UE 102 may determine the DMRS configuration 107 based on the $I_{DMRS}$ included in the DL assignment DCI.

In the case of a UL transmission, the eNB 160 may schedule a PUSCH transmission from the UE 102 to the eNB 160. The eNB 160 may determine the $I_{DMRS}$ as described above. The $I_{DMRS}$ field in the UL assignment DCI may be set to the value corresponding to the value of $I_{DMRS}$. Therefore, the UE 102 may determine the DMRS configuration 107 based on the $I_{DMRS}$ included in the UL assignment DCI.

In a second alternative implementation, the DCI may include $I_{MCS}$ and $N_{PRB}$ to implicitly signal the DMRS configuration 107 to the UE 102. For example, the DCI may include an MCS field and a resource allocation field. The value of the MCS field may be set to the value of $I_{MCS}$. The value of the resource allocation field may be set to the value of $N_{PRB}$. In the case of a DL transmission, the DCI may be DL assignment DCI. In the case of a UL transmission, the DCI may be UL assignment DCI. Therefore, in this implementation, the UE 102 may determine the DMRS configuration 107 based on the $I_{MCS}$ and $N_{PRB}$ included in the DCI.

The eNB 160 may send 206 the DCI. In the case of a DL transmission, the eNB 160 may send 206 a DL assignment DCI. The eNB 160 may send 206 the DL assignment DCI in association with a PDSCH transmission. In the case of a UL transmission, the eNB 160 may send 206 a UL assignment DCI. The DCI (e.g., DL assignment DCI and UL assignment DCI) may be sent on the PDCCH or ePDCCH.

It should be noted that in the case of a UL transmission, the eNB 160 may receive a PUSCH transmission from the UE 102. The eNB 160 may use the DMRS configuration 107 that was determined 202 when the PUSCH transmission was scheduled by the eNB 160. For example, the eNB 160 may estimate the channel (e.g., the PUSCH) and decode the PUSCH transmission data based on the DMRS configuration 107.

The above method 200 may also be applicable to single-codeword and multiple-codeword transmission of single user multiple-input multiple-output (SU-MIMO) as well as single codeword and multiple codeword transmission of multi user multiple-input multiple-output (MU-MIMO). For MU-MIMO, multiple PDSCH transmissions may be targeted to multiple UEs 102, which are scheduled on the same resource block. In one implementation of dynamic DMRS selection in the context of SU-MIMO and MU-MIMO, the DCI (for a UL grant as well as a DL grant) may include a field (of length 1 bit or more) that indicates $I_{DMRS}$. The eNB 160 may set the $I_{DMRS}$ field in the DCI and send 206 the DCI to the one or more UEs 102. For UL transmission, upon receiving a PUSCH transmission, the eNB 160 may use the value of the $I_{DMRS}$ to estimate the channel and decode the PUSCH transmission data.

Figure 3:
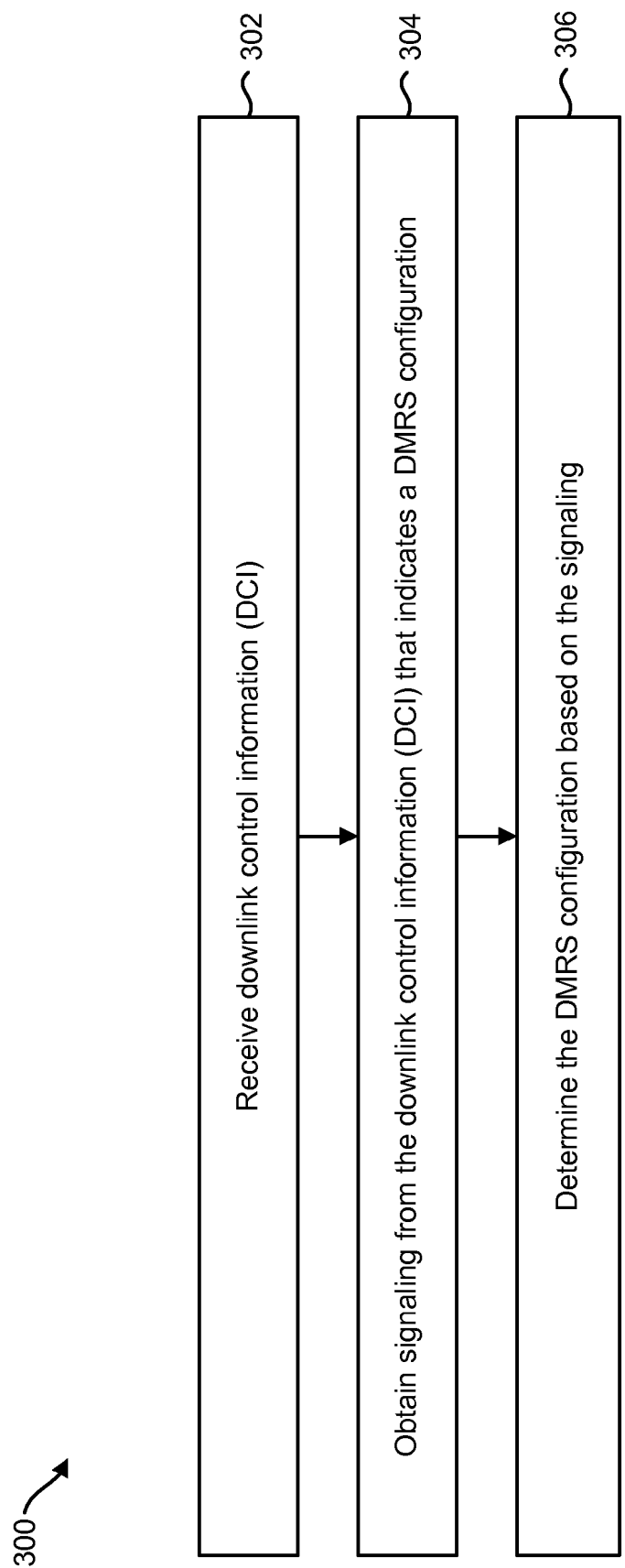
FIG. 3 is a flow diagram illustrating one implementation of a method for determining a DMRS by a UE.

FIG. 3 is a flow diagram illustrating one implementation of a method 300 for determining a DMRS by a UE 102. The UE 102 may be configured (by an eNB 160, for instance) with multiple DMRS configurations 130. Each DMRS configuration 130 is different from another DMRS configuration 130 in at least one or both of the following parameters: DMRS pattern and the modulation order of the DMRS sequence symbols. The DMRS configurations 130 of the UE 102 may correspond to a DMRS configuration 107 determined by an eNB 160. In Release-11 of 3GPP, the DMRS sequence symbols may be pseudo-randomly selected from QPSK modulation symbols. Therefore, the DMRS sequence may consist of QPSK symbols. It is also possible to generate the DMRS sequence symbols from a different modulation scheme (e.g., 8PSK or 64-QAM). It should be noted that the DMRS configurations 130 may be static or semi-static.

The UE 102 may receive 302 DCI. For example, the UE 102 may receive 302 the DCI from the eNB 160. In the case of a DL transmission, the DCI may be a DL assignment DCI and may be received with a PDSCH transmission. In the case of a UL transmission, the DCI may be a UL assignment DCI. The DCI may be received 302 on the PDCCH or ePDCCH.

The UE 102 may obtain 304 signaling from the DCI that indicates a DMRS configuration 130. The DMRS configuration 130 may be based on an MCS. For example, the DMRS configuration 130 may correspond to a DMRS configuration 107 determined by the eNB 160, as described above in connection with FIG. 2. In one implementation, the signaling may include one of an $I_{MCS}$ or an $N_{PRB}$ or both. In another implementation, the signaling may include an $I_{DMRS}$.

In one alternative implementation, the DCI may include an $I_{DMRS}$ field, which may include the $I_{DMRS}$. In a second alternative implementation, the DCI may include an MCS field and a resource allocation field, which may indicate the $I_{MCS}$ and $N_{PRB}$.

The UE 102 may obtain 304 the $I_{MCS}$ by reading the MCS field in the DCI. The UE 102 may also obtain 304 the $N_{PRB}$ from the resource allocation field. In one implementation, the UE 102 may obtain 304 the $N_{PRB}$ by first determining a resource allocation type by reading a resource allocation field in the DCI. If the resource allocation field does not exist, then the UE 102 may use a default resource allocation type. Upon determining the resource allocation type, the UE 102 may determine the $N_{PRB}$ by reading the resource assignment field in the DCI based on the resource allocation type.

It should be noted that the UE 102 may also obtain 304 the TBS based on the $I_{MCS}$ and $N_{PRB}$. This may be accomplished as described above in connection with FIG. 2. For example, the TBS may be obtained 304 using a lookup table as illustrated in Table (1), Table (2) and Table (3) above.

The UE 102 may determine 306 the DMRS configuration 130 based on the signaling. This may be accomplished as described above in connection with FIG. 2. For example, in one implementation, the UE 102 may determine 306 the DMRS configuration 130 directly from the $I_{DMRS}$ as illustrated in Table (6) above. In another implementation, the UE 102 may determine 306 the DMRS configuration 130 based on $I_{MCS}$ and $N_{PRB}$ as illustrated in Table (4) above. In yet another implementation, the UE 102 may first determine $I_{DMRS}$ based on $I_{MCS}$ and $N_{PRB}$ as illustrated in Table (5) above, and then the UE 102 may determine 306 the DMRS configuration 130 from $I_{DMRS}$ as illustrated in Table (6).

In the case of a multiple-codeword transmission, the $I_{MCS}$ for the multiple codewords may be determined as described above in connection with FIG. 2. For example, if $I_{MCS,CW0}$ and $I_{MCS,CW1}$ are not equal, then the UE 102 may always use one of $I_{MCS,CW0}$ or $I_{MCS,CW1}$ to determine 306 the DMRS configuration 130. In another implementation, if $I_{MCS,CW0}$ and $I_{MCS,CW1}$ are not equal, then the UE 102 may use the minimum value of $I_{MCS,CW0}$ and $I_{MCS,CW1}$ (e.g., min ($I_{MCS,CW0}$, $I_{MCS,CW1}$)). In yet another implementation, if $I_{MCS,CW0}$ and $I_{MCS,CW1}$ are not equal, then the UE 102 may use the maximum value of $I_{MCS,CW0}$ and $I_{MCS,CW1}$ (e.g., max ($I_{MCS,CW0}$, $I_{MCS,CW1}$)).

The UE 102 may use the DMRS configuration 130 for DL transmissions and UL transmissions. For a DL transmission, the UE 102 may use the DMRS configuration 130 to estimate the channel, demodulate the symbols received on the PDSCH and decode the one or more codewords received in the PDSCH transmission. For a UL transmission, the UE 102 may use the DMRS configuration 130 to modulate and encode a PUSCH transmission that may be sent to the eNB 160.

In the case of SU-MIMO or MU-MIMO, for a DL transmission, the UE 102 may also use the DMRS configuration 130 to estimate the channel, demodulate the symbols received on the PDSCH and decode the one or more codewords received in the PDSCH transmission. For a SU-MIMO or MU-MIMO UL transmission, the UE 102 may use the DMRS configuration 130 to modulate and encode a PUSCH transmission that may be sent to the eNB 160.

FIG. 4 is a block diagram illustrating examples of DMRS patterns 423*a-c*. A DMRS pattern 423 may be defined as the resource elements occupied by the DMRS symbols. For example, the shaded resource elements in FIG. 4 may be occupied by DMRS symbols. A DMRS pattern 423 may also be referred to as a DMRS resource element pattern. The DMRS pattern 423 may indicate the number of symbols allocated for transmission of a codeword (in rate matching)

associated with a PDSCH transmission. Additionally or alternatively, the DMRS pattern 423 may indicate the location of punctured symbols. An eNB 160 or UE 102 may select DMRS configurations 107, 130 that may use different DMRS patterns 423 as described above.

A number of resource elements may constitute a resource block. A resource block may be defined by the resource elements in K consecutive subcarriers in the frequency domain and L consecutive OFDM/SC-FDMA symbols. A resource grid is defined by K consecutive subcarriers and L OFDM/SC-FDMA symbols. A number of resource elements (and a number of resource blocks, for example) may constitute a slot. A slot may be defined according to an amount of time. For instance, a slot may occupy 0.5 milliseconds (ms). Two slots may constitute a subframe. A number of subframes (e.g., 10) may constitute one radio frame. Each DMRS pattern 423 may include even-numbered slots 425a-c and odd-numbered slots 427a-c.

The DMRS patterns 423a-c illustrated in FIG. 4 are examples of DL channel generation according to Release-11. Specifically, the DMRS patterns 423a-c illustrate the resource elements used for UE-specific reference signals for normal cyclic prefix for antenna ports 7 and 8. DMRS pattern-A 423a may be used for special subframe configuration 1, 2, 6 or 7. DMRS pattern-B 423b may be used for special subframe configuration 3, 4, 8 or 9. DMRS pattern-C 423c may be used for all other downlink subframes.

FIG. 5 is a block diagram illustrating additional examples of DMRS patterns 523a-c. The DMRS patterns 523a-c indicate the resource elements occupied by the DMRS symbols. For example, the shaded resource elements in FIG. 5 may be occupied by DMRS symbols. Each DMRS pattern 523 may include even-numbered slots 525a-c and odd-numbered slots 527a-c.

The DMRS patterns 523a-c illustrated in FIG. 5 are examples of DL channel generation according to Release-11. Specifically, the DMRS patterns 523a-c illustrate the resource elements used for UE-specific reference signals for normal cyclic-prefix for antenna ports 9 and 10. DMRS pattern-A 523a may be used for special subframe configuration 1, 2, 6 or 7. DMRS pattern-B 523b may be used for special subframe configuration 3, 4, 8 or 9. DMRS pattern-C 523c may be used for all other downlink subframes.

FIG. 6 is a block diagram illustrating further examples of DMRS patterns 623a-d. The DMRS patterns 623a-d indicate the resource elements occupied by the DMRS symbols. For example, the shaded resource elements in FIG. 6 may be occupied by DMRS symbols. A first DMRS pattern 623a is an example of a DMRS pattern for a PUSCH transmission according to Release-11. A second DMRS pattern 623b is an example of a DMRS pattern that may be used for PUSCH transmission not defined in Release-11.

A third DMRS pattern 623c is an example of a DMRS pattern on antenna port 7 for a frequency division duplex (FDD) system and a normal cyclic-prefix according to Release-11 specifications. A fourth DMRS pattern 623d is another example of a DMRS pattern on antenna port 7 for an FDD system and a normal cyclic-prefix.

Figure 7:
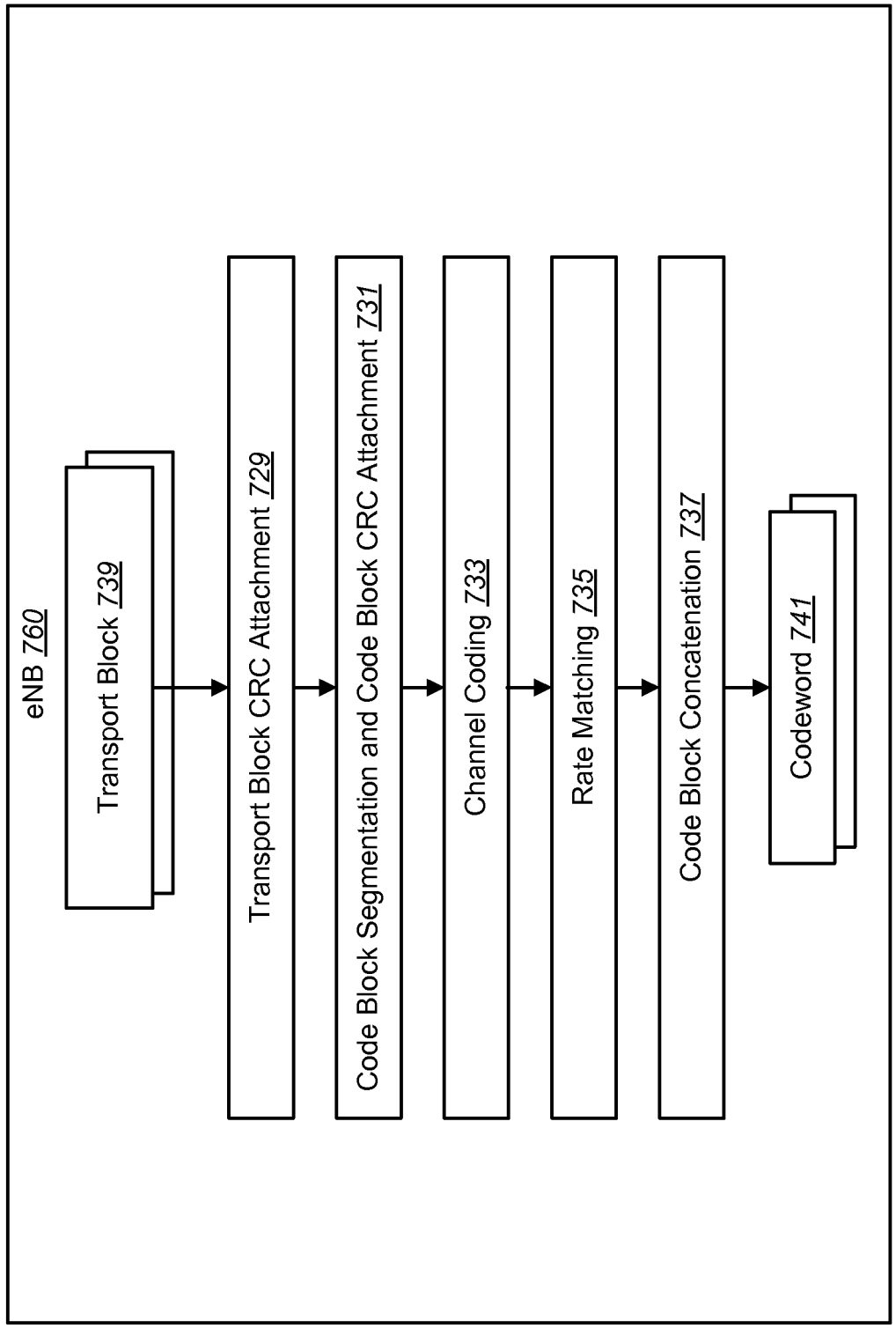
FIG. 7 is a block diagram illustrating one implementation of an eNB in which systems and methods for DMRS selection may be implemented.

FIG. 7 is a block diagram illustrating one implementation of an eNB 760 in which systems and methods for DMRS selection may be implemented. The eNB 760 described in connection with FIG. 7 may be implemented in accordance with the eNB 160 described in connection with FIG. 1. FIG. 7 shows one example of a processing structure for each transport block 739 for the downlink-synchronization channel (DL-SCH), paging channel (PCH) and multicast channel (MCH). In some implementations, the processing steps illustrated in FIG. 7 may be performed by an encoder 109, which may also be referred to as a coding unit.

Data may arrive at the coding unit in the form of a maximum of two transport blocks 739 every transmission time interval (TTI) per DL cell. For example, the eNB 760 may include an eNB operations module 182 (not shown), which may include an eNB DMRS configuration determination module 196, one or more DMRS configurations 107 and a DCI determination module 198. The eNB DMRS configuration determination module 196 may determine a DMRS configuration 107 as described above in connection with FIG. 2. The DCI determination module 198 may determine a DCI based on the DMRS configuration 107 as described above in connection with FIG. 2. The eNB operations module 182 may provide data (e.g., the DCI) to the coding unit to be processed for transmission.

The eNB 160 may perform a series of coding steps for each transport block 739 of a DL cell. A transport block CRC attachment module 729 may add CRC information to the transport block. A code block segmentation and code block CRC attachment module 731 may perform code block segmentation and add CRC information to the one or more code blocks. A channel coding module 733 may perform channel coding for the transport block. A rate matching module 735 may perform rate matching for the transport block. A code block concatenation module 737 may perform code block concatenation for the transport block.

The eNB 760 may produce one or more codewords 741 based on the one or more transport blocks 739. The codeword 741 is the output (e.g., coded bits) from the coding unit for a transport block 739. The eNB 760 may produce one or two codewords 741 for every TTI corresponding to the one or two transport blocks 739 of a DL cell.

Figure 8:
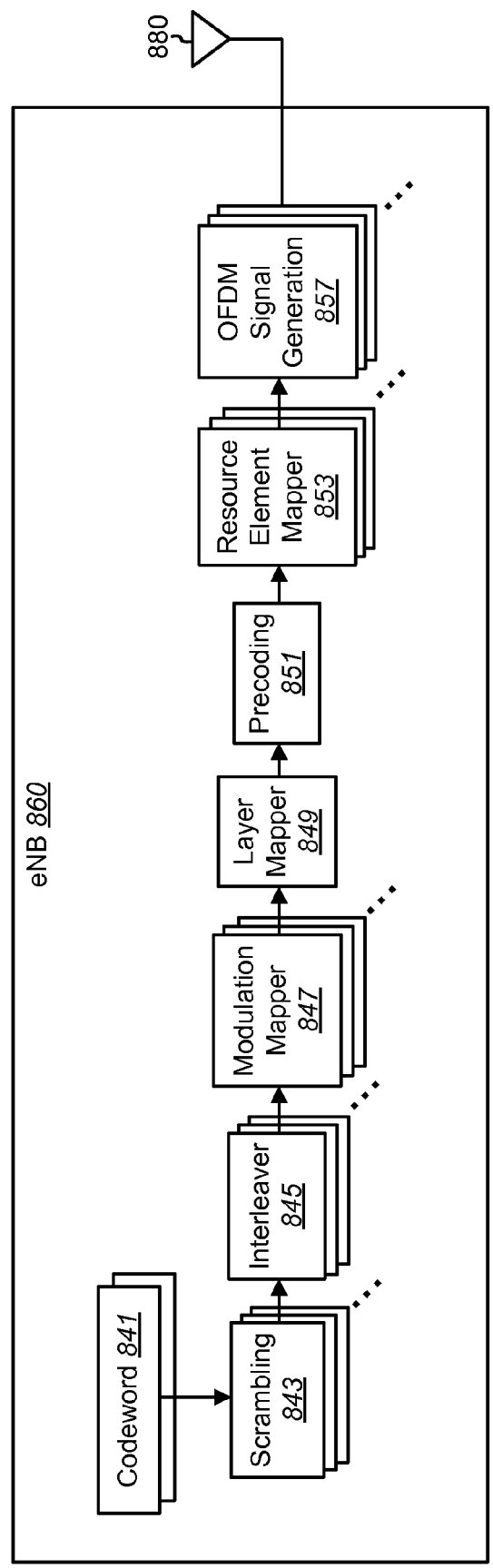
FIG. 8 is a block diagram illustrating another implementation of an eNB in which systems and methods for DMRS selection may be implemented.

FIG. 8 is a block diagram illustrating another implementation of an eNB 860 in which systems and methods for DMRS selection may be implemented. The eNB 860 described in connection with FIG. 8 may be implemented in accordance with the eNB 160 described in connection with FIG. 1. The eNB 860 may include one or more scrambling modules 843, one or more interleavers 845, one or more modulation mappers 847, a layer mapper 849, a pre-coding module 851, one or more resource element mappers 853, one or more orthogonal frequency-division multiplexing (OFDM) signal generation modules 857 and one or more antennas 880.

The eNB 860 may generate a baseband signal representing a DL physical channel. Codewords 841 may be optionally provided to the one or more scrambling modules 843. The codewords 841 may be generated as described above in connection with FIG. 7. For example, the codewords 841 may be processed (e.g., coded) data that may include a DCI, which includes signaling to indicate a DMRS configuration 107 to a UE 102. The DCI and DMRS configuration 107 may be determined as described above in connection with FIG. 2.

The codewords 841 may (optionally) be provided to the scrambling modules 843. For example, the one or more scrambling modules 843 may scramble the codewords 841 with a scrambling sequence that is specific to a particular cell.

The (optionally scrambled) codewords 841 may be optionally provided to one or more interleavers 845. The one or more interleavers 845 may optionally shuffle the codewords 841. It should be noted that the one or more interleavers 845 may be placed in a different order in the signal path than is illustrated in FIG. 8.

The (optionally interleaved and/or scrambled) codewords 841 may be provided to one or more modulation mappers 847. The one or more modulation mappers 847 may map the codewords 841 to constellation points based on a particular modulation scheme (e.g., QAM, 64-QAM, Binary Phase Shift Keying (BPSK), QPSK, etc.). The modulation mappers 847 may generate complex-valued modulation symbols.

The (modulated) codewords 841 (e.g., complex-valued modulation symbols) may be optionally provided to a layer mapper 849. The layer mapper 849 may optionally map the codewords 841 to one or more layers (for transmission on one or more spatial streams, for example).

The (optionally layer-mapped) codewords 841 may be optionally provided to the pre-coding module 851. The pre-coding module 851 may optionally pre-code the codewords 841 (e.g., complex-valued modulation symbols) on each layer for transmission on the antenna 880 ports.

The (optionally pre-coded) codewords 841 may be provided to one or more resource element mappers 853. A resource element mapper 853 may map the codewords 841 to one or more resource elements. As described above, a resource element may be an amount of time and frequency resources on which information may be carried (e.g., sent and/or received). For example, one resource element may be defined as a particular subcarrier in an OFDM symbol for a particular amount of time.

In some configurations, each resource element may carry one modulated symbol. Accordingly, the number of bits carried in a resource element may vary. For example, each BPSK symbol carries one bit of information. Thus, each resource element that carries a BPSK symbol carries one bit. Each QPSK symbol carries two bits of information. Thus, a resource element that carries a QPSK symbol carries two bits of information. Similarly, a resource element carrying a 16-QAM symbol carries four bits of information and a resource element carrying a 64-QAM symbol carries six bits of information.

The (resource-mapped) codewords 841 may be provided to one or more OFDM signal generators 857. The one or more OFDM signal generators 857 may generate OFDM signals based on the (resource-mapped) codewords 841 for transmission. The OFDM signals generated by the one or more OFDM signal generators 857 may be provided to the one or more antennas 880 (e.g., antenna ports) for transmission to the one or more UEs 102.

More generally, the codewords 841 generated by the eNB 860 may be scrambled and/or interleaved. After optional scrambling and/or interleaving, the codewords 841 may be mapped into modulation symbols. Each symbol may then be loaded into a resource element.

It should be noted that UE-specific reference signals associated with PDSCH (e.g., a DMRS) may be transmitted on antenna 880 ports 5, 7, and/or 8. Additionally or alternatively, the UE-specific reference signals associated with PDSCH (e.g., DMRS) may be transmitted on an antenna 880 port p=7, 8, . . . , v+6, where p is the antenna 880 port and v is the number of layers used for transmission of the PDSCH.

Figure 9:
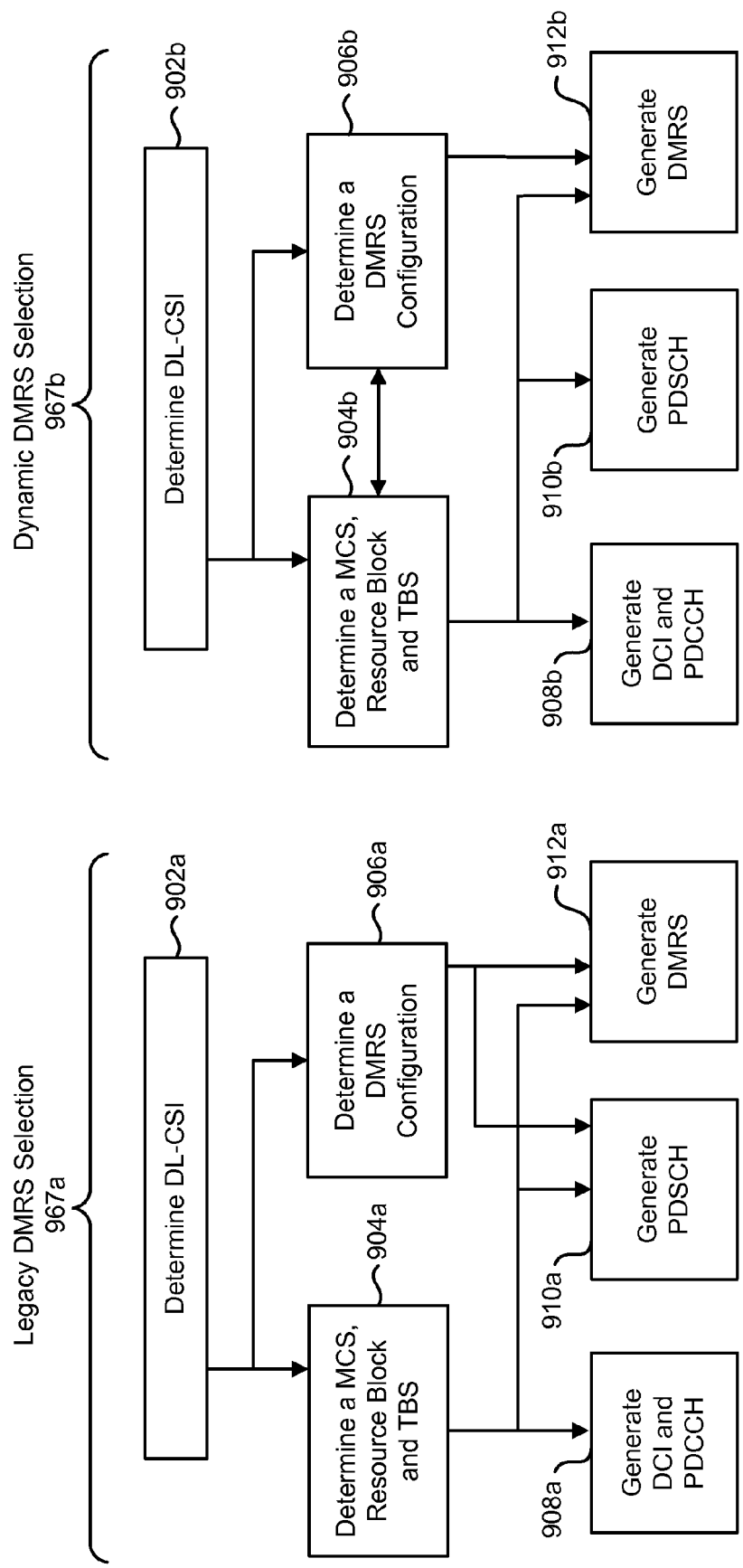
FIG. 9 is a flow diagram illustrating legacy DMRS selection and dynamic DMRS selection in accordance with the disclosed systems and methods.

FIG. 9 is a flow diagram illustrating legacy DMRS selection 967a and dynamic DMRS selection 967b in accordance with the disclosed systems and methods. The legacy DMRS selection 967a example illustrates DMRS generation by an eNB 160 operating according to Release-11.

The eNB 160 may determine 902a the DL-CSI. In one implementation, the eNB 160 may transmit a reference signal to a UE 102 to enable the UE 102 to measure the DL-CSI. For example, the reference signal may be a channel state information reference signal (CSI-RS). The UE 102 may receive the transmitted CSI-RS and measure the DL-CSI. The measured DL-CSI may be sent back to the eNB 160 via feedback and as part of the uplink control information (UCI).

In another example, in which the eNB 160 and UE 102 may communicate using a time division duplex (TDD), the eNB 160 and UE 102 share the same spectrum for transmission. In this case, the DL-CSI may be measured directly at the eNB 160. For example, the UE 102 may transmit a reference signal (e.g., a sounding reference signal (SRS)) that is received by the eNB 160. The eNB 160 may measure the DL-CSI from the received SRS.

The eNB 160 may determine 904a the MCS, $N_{PRB}$ and TBS for a transmission. This may be accomplished as described above in connection with FIG. 2. The transmission may be either a DL transmission (e.g., PDSCH) or a UL transmission (e.g., PDSCH).

The eNB 160 may determine 906a a DMRS configuration 107. The DMRS configuration 107 may include one or more of the DMRS pattern, a DMRS sequence, a pseudo random number generator algorithm, and scrambling sequence. It should be noted that in the legacy DMRS selection 967a, the DMRS configuration 107 determination 906a is not based on the MCS or the $N_{PRB}$.

Upon determining 904a the MCS, $N_{PRB}$ and TBS, the eNB 160 may generate 908a a DCI and a PDCCH based on the MCS, $N_{PRB}$ and TBS. For example, a DCI (e.g., DL assignment DCI or UL assignment DCI) may be carried on a PDCCH (or ePDCCH) transmission. The eNB 160 may encode and modulate the PDCCH transmission (and DCI) according to the MCS, $N_{PRB}$ and TBS and send the PDCCH transmission to the UE 102.

Furthermore, upon determining 904a the MCS, $N_{PRB}$ and TBS and upon determining 906a the DMRS configuration 107, the eNB 160 may generate 910a a PDSCH transmission based on the MCS, $N_{PRB}$, TBS and DMRS configuration 107. For example, the eNB 160 may encode and modulate the PDSCH transmission according to the MCS, $N_{PRB}$, TBS and DMRS configuration 107.

Additionally, upon determining 904a the MCS, $N_{PRB}$ and TBS and upon determining 906a the DMRS configuration 107, the eNB 160 may generate 912a the DMRS based on the MCS, $N_{PRB}$, TBS and DMRS configuration 107. For example, the eNB 160 may encode and modulate the DMRS according to the MCS, $N_{PRB}$, TBS and DMRS configuration 107.

The dynamic DMRS selection 967b example illustrates DMRS generation by an eNB 160 according to the systems and methods described herein. In dynamic DMRS selection 967b, the eNB 160 may generate determine a DMRS configuration 107 based on an MCS and map the DMRS configuration to the physical resource elements. The dynamic DMRS selection 967b example shows the dependency between the DMRS and the MCS according to the systems and methods described herein.

The eNB 160 may determine 902b the DL-CSI. This may be accomplished as described above.

The eNB 160 may determine 904b the MCS, $N_{PRB}$ and TBS for a transmission. This may be accomplished as described above in connection with FIG. 2. The transmission may be either a DL transmission (e.g., PDSCH) or a UL transmission (e.g., PUSCH).

The eNB 160 may determine 906b a DMRS configuration 107. For example, the eNB 160 may determine 906b the DMRS configuration 107 based on the MCS. The eNB 160 may also determine 906b the DMRS configuration based on the $N_{PRB}$ or a combination of the MCS and the $N_{PRB}$. In one implementation, the eNB 160 may first determine an $I_{DMRS}$ based on the MCS and $N_{PRB}$ as illustrated in Table (5) above. The eNB 160 may then determine the DMRS configuration 107 based on the $I_{DMRS}$ as illustrated in Table (6) above. In another implementation, the eNB 160 determine the DMRS configuration 107 directly from the MCS and $N_{PRB}$ as illustrated in Table (4) above. It should be noted that in dynamic DMRS selection 967b, the DMRS configuration 107 is mapped to (e.g., associated with) the MCS and/or the $N_{PRB}$.

Upon determining 904b the MCS, $N_{PRB}$ and TBS and upon determining 906b the DMRS configuration 107, the eNB 160 may generate 908b a DCI and a PDCCH based on the MCS, $N_{PRB}$, TBS and DMRS configuration 107. In one implementation, the DCI may include an $I_{DMRS}$ to explicitly indicate the DMRS configuration 107 to the UE 102. In another implementation, the DMRS configuration 107 may be implicitly indicated to the UE 102 via an $I_{MCS}$ and $N_{PRB}$ included in the DCI. The DCI (e.g., DL assignment DCI or UL assignment DCI) may be carried on a PDCCH (or ePDCCH) transmission. The eNB 160 may encode and modulate the PDCCH transmission (and DCI) according to the MCS, $N_{PRB}$ and TBS and send the PDCCH transmission to the UE 102.

Furthermore, upon determining 904b the MCS, $N_{PRB}$ and TBS and upon determining 906b the DMRS configuration 107, the eNB 160 may generate 910b a PDSCH transmission based on the MCS, $N_{PRB}$, TBS and DMRS configuration 107. For example, the eNB 160 may encode and modulate the PDSCH transmission according to the MCS, $N_{PRB}$, TBS and DMRS configuration 107. It should be noted that in dynamic DMRS selection 967b, the DMRS configuration 107 is based on the MCS and the $N_{PRB}$.

Additionally, upon determining 904b the MCS, $N_{PRB}$ and TBS and upon determining 906b the DMRS configuration 107, the eNB 160 may generate 912b the DMRS based on the MCS, $N_{PRB}$, TBS and DMRS configuration 107. For example, the eNB 160 may encode and modulate the DMRS according to the MCS, $N_{PRB}$, TBS and DMRS configuration 107. It should be noted that one or more of the functions or procedures described in connection with FIG. 9 may additionally or alternatively be implemented as one or more modules included in the eNB 160 in some implementations. For example, the eNB 160 may include one or more of circuitry for determining 902b DL-CSI, circuitry for determining 904b a MCS, resource block and TBS, circuitry for determining 906b a DMRS configuration, circuitry for generating 908b DCI and a PDCCH, circuitry for generating 910b a PDSCH and circuitry for generating 912b a DMRS.

Figure 10:
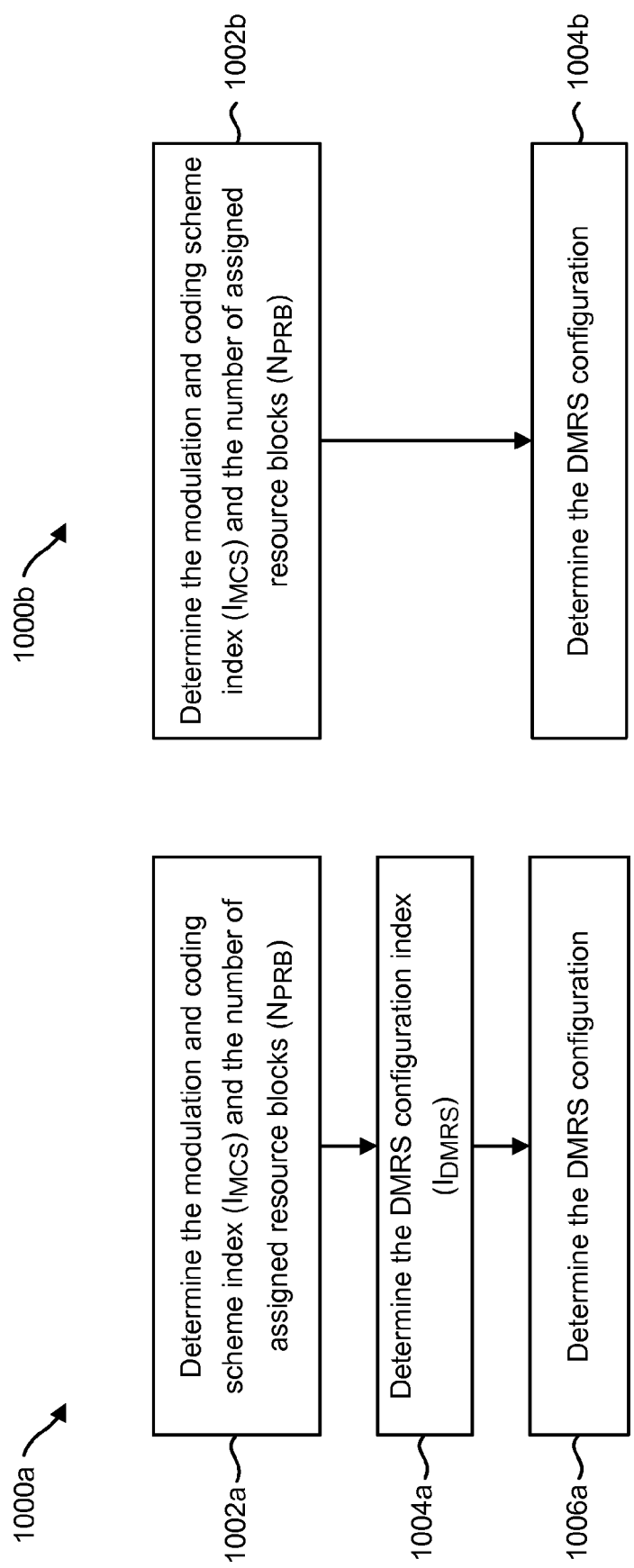
FIG. 10 is a flow diagram illustrating implementations of methods for determining a DMRS configuration by an eNB.

FIG. 10 is a flow diagram illustrating implementations of methods 1000a, 1000b for determining a DMRS configuration 107 by an eNB 160. In one method 1000a, the eNB 160 may determine the DMRS configuration 107 based on an $I_{DMRS}$. For example, the eNB 160 may determine 1002a an $I_{MCS}$ and an $N_{PRB}$. This may be accomplished as described above in connection with FIG. 2. For example, the $I_{MCS}$ may be based on a DL-CSI received from a UE 102. The eNB 160 may additionally or alternatively determine the $I_{MCS}$ based on one or more other factors, which may include DL frame error rate and quality of service (QoS). The $N_{PRB}$ may correspond to the number of resource blocks allocated for a transmission (e.g., DL transmission or UL transmission) to the UE 102.

The eNB 160 may determine 1004a the $I_{DMRS}$. In some implementations, the $I_{DMRS}$ may be determined using the $I_{MCS}$ and $N_{PRB}$ as entries in a lookup table as described above in connection with FIG. 2. The $I_{MCS}$ and $N_{PRB}$ may indicate rows and columns of a lookup table in which the entry of the table is $I_{DMRS}$. For example, $I_{DMRS}$ may be mapped to $I_{MCS}$ and $N_{PRB}$ as illustrated in Table (5) above.

The eNB 160 may determine 1006a the DMRS configuration 107. For example, upon determining 1004a the $I_{DMRS}$, the eNB 160 may determine 1006a the DMRS configuration 107 as illustrated in Table (6) above.

In another method 1000b, the eNB 160 may determine the DMRS configuration 107 based on $I_{MCS}$ and $N_{PRB}$ without the use of $I_{DMRS}$. For example, the eNB 160 may determine 1002b $I_{MCS}$ and $N_{PRB}$. This may be accomplished as described above.

The eNB 160 may determine 1004b the DMRS configuration 107. In one implementation, the DMRS configuration 107 may be determined 1004b using $I_{MCS}$ and $N_{PRB}$ as entries in a lookup table as described above in connection with FIG. 2. $I_{MCS}$ and $N_{PRB}$ may indicate rows and columns of a lookup table in which the entry of the table is the DMRS configuration 107. For example, the DMRS configuration 107 may be mapped to $I_{MCS}$ and $N_{PRB}$ as illustrated in Table (4) above.

Figure 11:
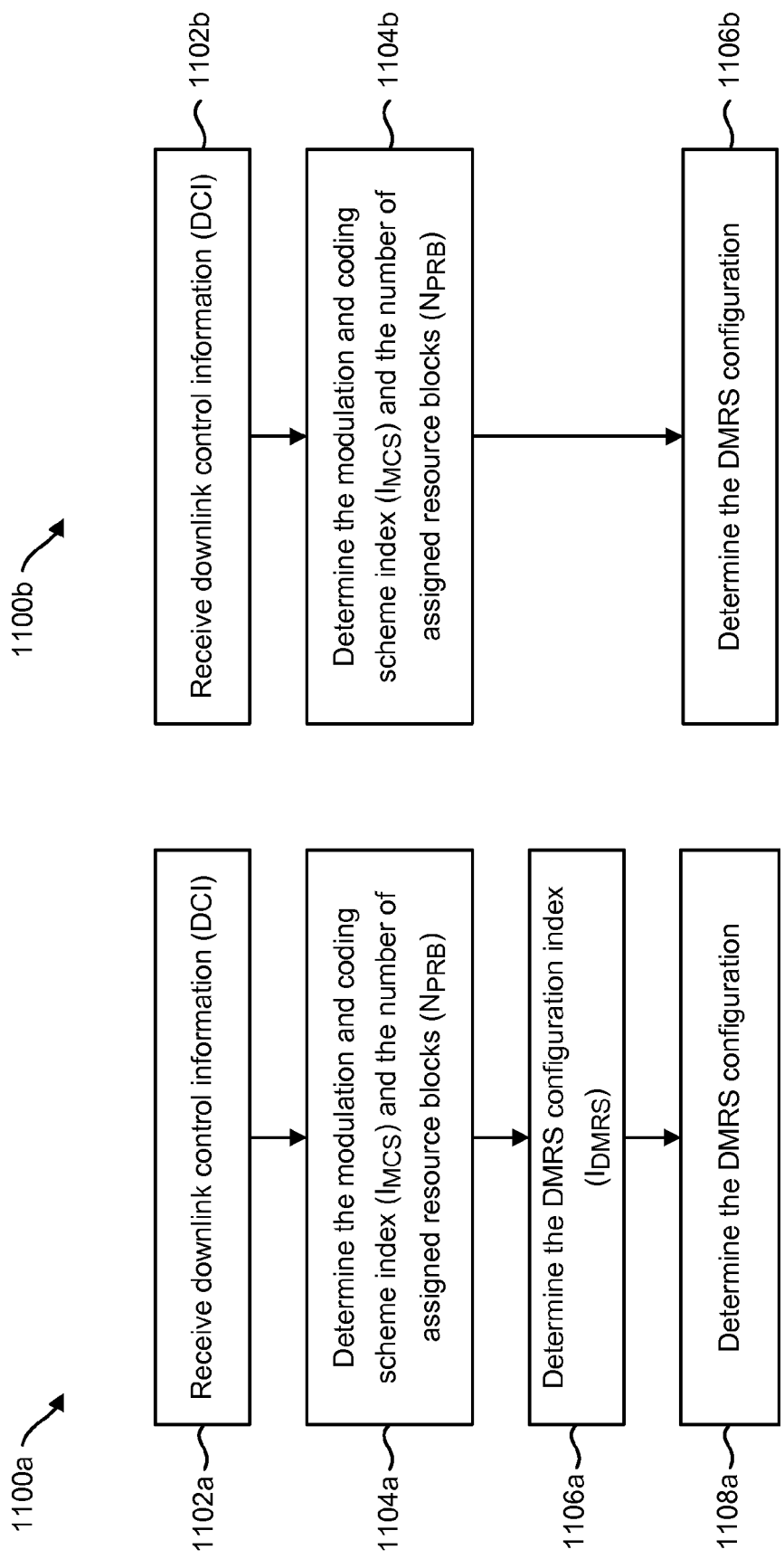
FIG. 11 is a flow diagram illustrating implementations of methods for determining a DMRS configuration by a UE.

FIG. 11 is a flow diagram illustrating implementations of methods 1100a, 1100b for determining a DMRS configuration 130 by a UE 102. In one method 1100a, the UE 102 may determine the DMRS configuration 130 based on an $I_{DMRS}$. For example, the UE 102 may receive 1102a DCI. The UE 102 may receive 1102a the DCI from an eNB 160. In the case of a DL transmission, the DCI may be a DL assignment DCI and may be received with a PDSCH transmission. In the case of a UL transmission, the DCI may be a UL assignment DCI.

The UE 102 may determine 1104a an $I_{MCS}$ and an $N_{PRB}$. This may be accomplished as described above in connection with FIG. 3. For example, the UE 102 may determine 1104a the $I_{MCS}$ by reading the MCS field in the DCI. The UE 102 may also determine 1104a the $N_{PRB}$ from the resource allocation field in the DCI.

The UE 102 may determine 1106a the $I_{DMRS}$. In one implementation, the $I_{DMRS}$ may be determined using $I_{MCS}$ and $N_{PRB}$ as entries in a lookup table as described above in connection with FIG. 2. $I_{MCS}$ and $N_{PRB}$ may indicate rows and columns of a lookup table in which the entry of the table is $I_{DMRS}$. For example, $I_{DMRS}$ may be mapped to $I_{MCS}$ and $N_{PRB}$ as illustrated in Table (5) above.

In another implementation, the DCI may include an $I_{DMRS}$ field, which may include the $I_{DMRS}$. Therefore, in this implementation, the UE 102 may determine 1106a the $I_{DMRS}$ directly from the DCI.

The UE 102 may determine 1108a the DMRS configuration 130. For example, upon determining 1106a the $I_{DMRS}$, the UE 102 may determine 1108a the DMRS configuration 130 as illustrated in Table (6) above.

In another method 1100b, the UE 102 may determine the DMRS configuration 130 based on $I_{MCS}$ and $N_{PRB}$ without the use of $I_{DMRS}$. For example, the UE 102 may receive 1102b DCI. This may be accomplished as described above.

The UE 102 may determine 1104b the $I_{MCS}$ and $N_{PRB}$. This may be accomplished as described above.

The UE 102 may determine 1106b the DMRS configuration 130. In one implementation, the DMRS configuration 130 may be determined 1106b using $I_{MCS}$ and $N_{PRB}$ as entries in a lookup table. $I_{MCS}$ and $N_{PRB}$ may indicate rows and columns of a lookup table in which the entry of the table is the DMRS configuration 130. For example, the DMRS configuration 130 may be mapped to $I_{MCS}$ and $N_{PRB}$ as illustrated in Table (4) above.

Figure 12:
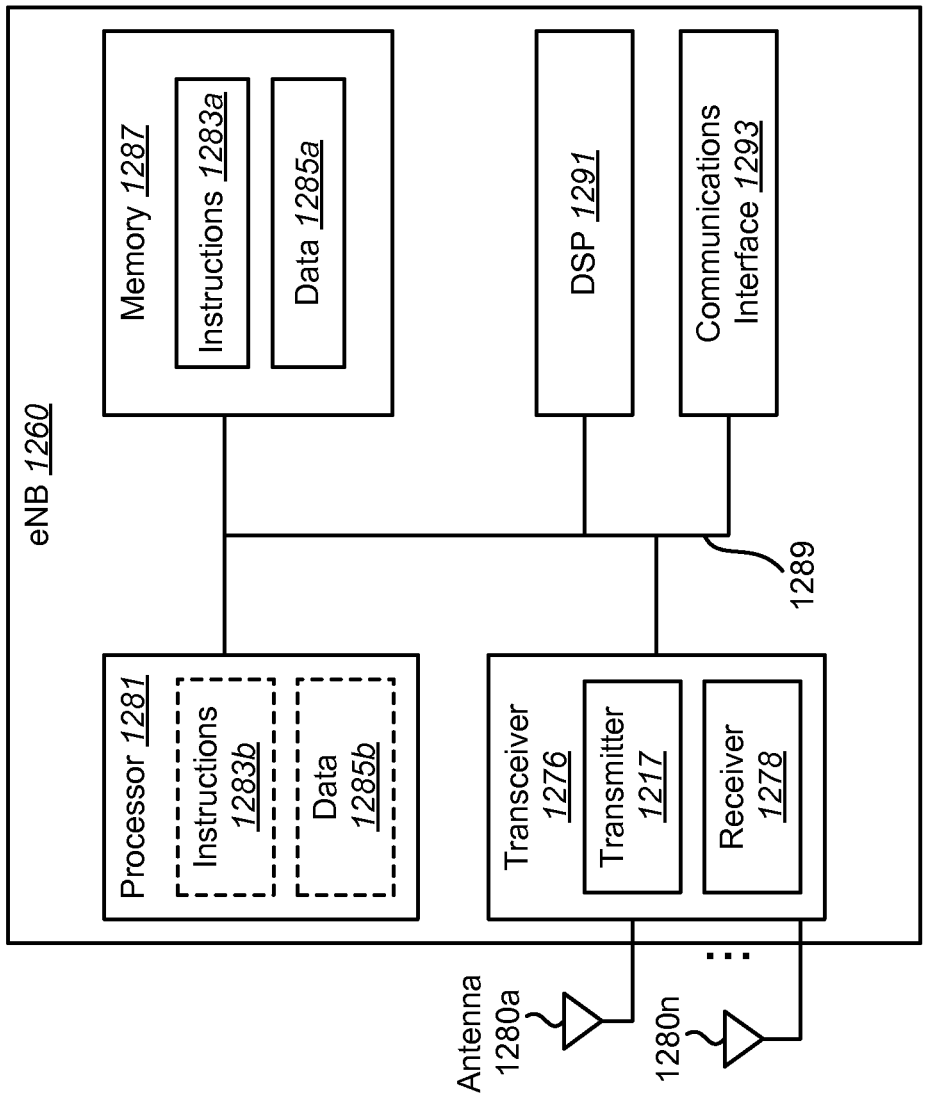
FIG. 12 illustrates various components that may be utilized in an eNB.

FIG. 12 illustrates various components that may be utilized in an eNB 1260. The eNB 1260 described in connection with FIG. 12 may be implemented in accordance with the eNB 160 described in connection with FIG. 1. The eNB 1260 includes a processor 1281 that controls operation of the eNB 1260. The processor 1281 may also be referred to as a central processing unit (CPU). Memory 1287, which may include read-only memory (ROM), random access memory (RAM), a combination of the two or any type of device that may store information, provides instructions 1283a and data 1285a to the processor 1281. A portion of the memory 1287 may also include non-volatile random access memory (NVRAM). Instructions 1283b and data 1285b may also reside in the processor 1281. Instructions 1283b and/or data 1285b loaded into the processor 1281 may also include instructions 1283a and/or data 1285a from memory 1287 that were loaded for execution or processing by the processor 1281. The instructions 1283b may be executed by the processor 1281 to implement one or more of the methods 200 described above.

The eNB 1260 may also include a housing that contains one or more transmitters 1217 and one or more receivers 1278 to allow transmission and reception of data. The transmitter(s) 1217 and receiver(s) 1278 may be combined into one or more transceivers 1276. One or more antennas 1280a-n are attached to the housing and electrically coupled to the transceiver 1276.

The various components of the eNB 1260 are coupled together by a bus system 1289, which may include a power bus, a control signal bus and a status signal bus, in addition to a data bus. However, for the sake of clarity, the various buses are illustrated in FIG. 12 as the bus system 1289. The eNB 1260 may also include a digital signal processor (DSP) 1291 for use in processing signals. The eNB 1260 may also include a communications interface 1293 that provides user access to the functions of the eNB 1260. The eNB 1260 illustrated in FIG. 12 is a functional block diagram rather than a listing of specific components.

Figure 13:
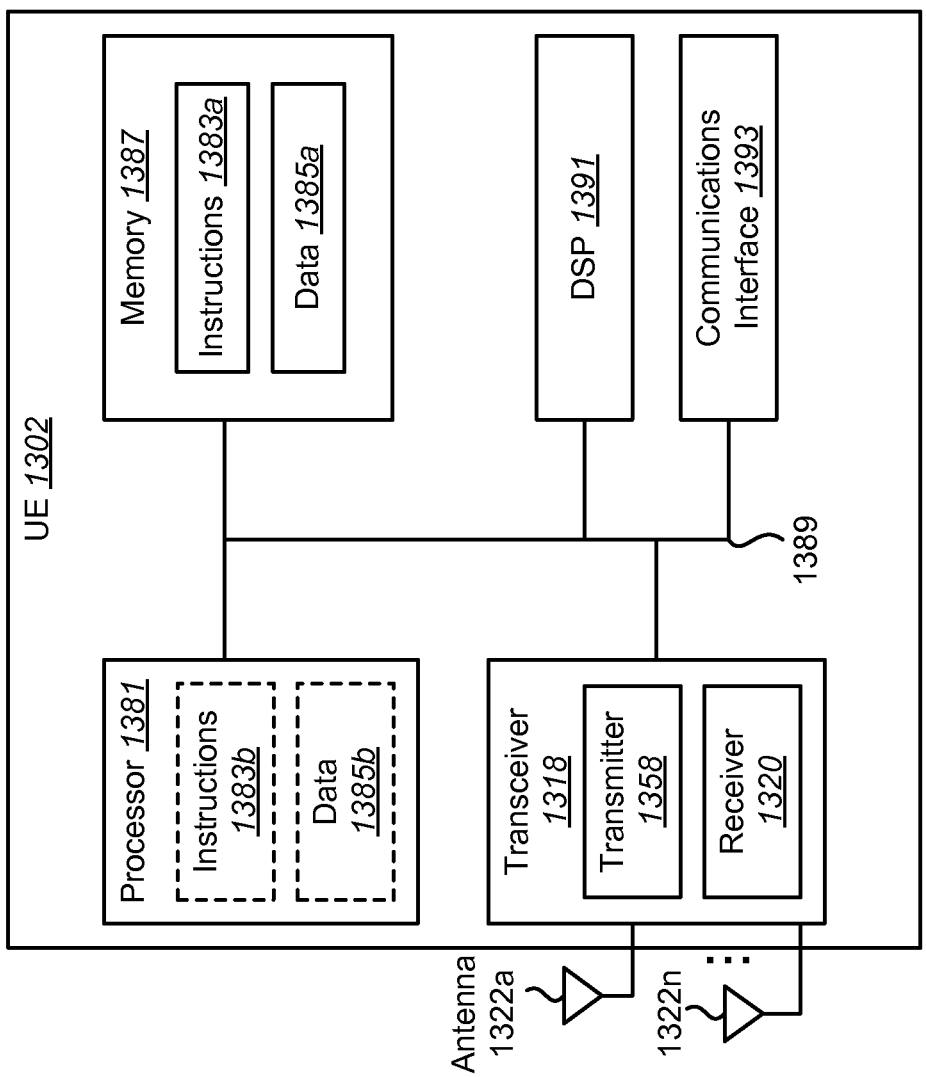
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1381 that controls operation of the UE 1302. The processor 1381 may also be referred to as a central processing unit (CPU). Memory 1387, which may include read-only memory (ROM), random access memory (RAM), a combination of the two or any type of device that may store information, provides instructions 1383a and data 1385a to the processor 1381. A portion of the memory 1387 may also include non-volatile random access memory (NVRAM). Instructions 1383b and data 1385b may also reside in the processor 1381. Instructions 1383b and/or data 1385b loaded into the processor 1381 may also include instructions 1383a and/or data 1385a from memory 1387 that were loaded for execution or processing by the processor 1381. The instructions 1383b may be executed by the processor 1381 to implement one or more of the methods 300 described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1389, which may include a power bus, a control signal bus and a status signal bus, in addition to a data bus. However, for the sake of clarity, the various buses are illustrated in FIG. 13 as the bus system 1389. The UE 1302 may also include a digital signal processor (DSP) 1391 for use in processing signals. The UE 1302 may also include a communications interface 1393 that provides user access to the functions of the UE 1302. The UE 1302 illustrated in FIG. 13 is a functional block diagram rather than a listing of specific components.

Figure 14:
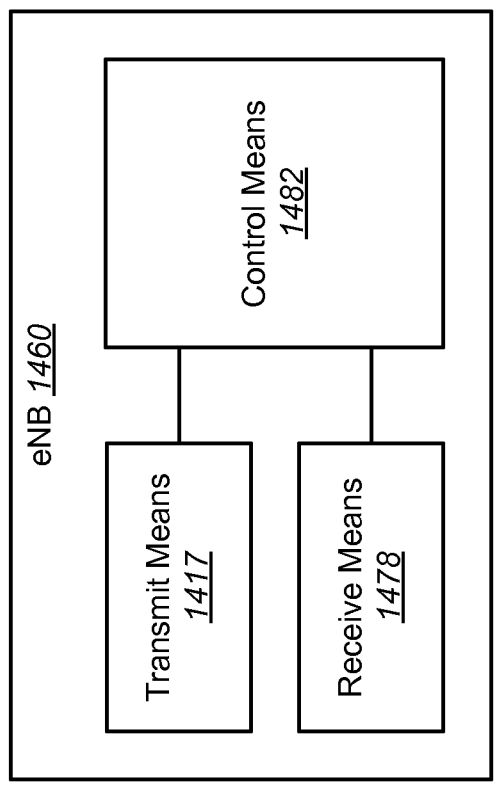
FIG. 14 is a block diagram illustrating one configuration of an eNB in which systems and methods for DMRS selection may be implemented.

FIG. 14 is a block diagram illustrating one configuration of an eNB 1460 in which systems and methods for DMRS selection may be implemented. The eNB 1460 includes transmit means 1417, receive means 1478 and control means 1482. The transmit means 1417, receive means 1478 and control means 1482 may be configured to perform one or more of the functions described in connection with FIG. 2, FIG. 7, FIG. 8, FIG. 9, FIG. 10 and FIG. 12 above. FIG. 12 above illustrates one example of a concrete apparatus structure of FIG. 14. Other various structures may be implemented to realize one or more of the functions of FIG. 2, FIG. 7, FIG. 8, FIG. 9, FIG. 10 and FIG. 12. For example, a DSP may be realized by software.

Figure 15:
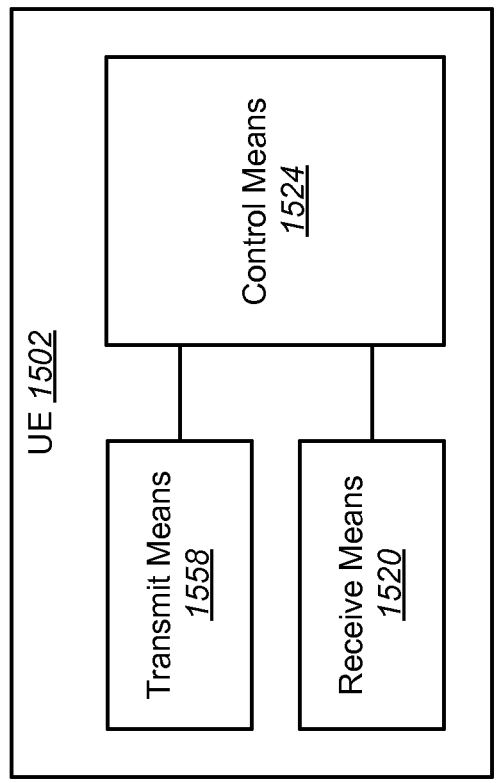
FIG. 15 is a block diagram illustrating one configuration of a UE in which systems and methods for DMRS selection may be implemented.

FIG. 15 is a block diagram illustrating one configuration of a UE 1502 in which systems and methods for DMRS selection may be implemented. The UE 1502 includes transmit means 1558, receive means 1520 and control means 1524. The transmit means 1558, receive means 1520 and control means 1524 may be configured to perform one or more of the functions described in connection with FIG. 3, FIG. 11 and FIG. 13 above. FIG. 13 above illustrates one example of a concrete apparatus structure of FIG. 15. Other various structures may be implemented to realize one or more of the functions of FIG. 3, FIG. 11 and FIG. 13. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, Electrically Erasable Programmable Read-Only Memory (EEPROM), Compact Disc Read-Only Memory (CD-ROM) or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An evolved Node B (eNB) for demodulation reference signal (DMRS) selection, comprising:
   a processor;
   memory in electronic communication with the processor, wherein instructions stored in the memory are executable to:
   determine a DMRS configuration;
   determine downlink control information (DCI), wherein the DCI comprises signaling that indicates a modulation and coding scheme (MCS) index and the MCS index is used to specify a modulation order and the DMRS configuration; and
   send the DCI.

2. The eNB of claim 1, wherein the DMRS configuration is determined from among multiple DMRS configurations that differ in at least one or both of a DMRS pattern and a DMRS sequence symbol modulation order.

3. The eNB of claim 1, wherein determining the DMRS configuration comprises determining a DMRS configuration index based on the MCS, wherein the DMRS configuration is determined based on the DMRS configuration index.

4. The eNB of claim 1, wherein determining the DMRS configuration comprises determining an MCS index and a number of physical resource blocks ($N_{PRB}$), wherein the DMRS configuration is determined based on the MCS index and the $N_{PRB}$.

5. The eNB of claim 4, wherein the MCS index is based on a single codeword associated with a single codeword transmission.

6. The eNB of claim 4, wherein the MCS index is based on at least one of a first codeword and a second codeword associated with a multiple codeword transmission.

7. The eNB of claim 1, wherein the signaling comprises at least one of a DMRS configuration index, an MCS index and a number of physical resource blocks ($N_{PRB}$).

8. The eNB of claim 1, wherein the DCI is a downlink (DL) assignment DCI corresponding to a physical downlink shared channel (PDSCH) transmission.

9. The eNB of claim 1, wherein the DCI is an uplink (UL) assignment DCI corresponding to a physical uplink shared channel (PUSCH) transmission.

10. The eNB of claim 9, further comprising instructions executable to:
    schedule a PUSCH transmission;
    receive a PUSCH transmission;
    estimate a channel based on the DMRS configuration; and
    decode the PUSCH transmission based on the DMRS configuration.

11. A user equipment (UE) for demodulation reference signal (DMRS) selection, comprising:
    a processor;
    memory in electronic communication with the processor, wherein instructions stored in the memory are executable to:
    receive downlink control information (DCI);
    obtain signaling from the DCI that indicates a modulation and coding scheme (MCS) index, wherein the MCS index is used to specify a modulation order and a DMRS configuration; and
    determine the DMRS configuration based on the signaling.

12. The UE of claim 11, wherein the DMRS configuration is determined from among multiple DMRS configurations that differ in at least one or both of a DMRS pattern and a DMRS sequence symbol modulation order.

13. The UE of claim 11, wherein determining the DMRS configuration comprises determining a DMRS configuration index based on the DCI, wherein the DMRS configuration is determined based on the DMRS configuration index.

14. The UE of claim 11, wherein determining the DMRS configuration comprises determining an MCS index and a number of physical resource blocks ($N_{PRB}$), wherein the DMRS configuration is determined based on the MCS index and the $N_{PRB}$.

15. The UE of claim 14, wherein the MCS index is based on a single codeword associated with a single codeword transmission.

16. The UE of claim 14, wherein the MCS index is based on at least one of a first codeword and a second codeword associated with a multiple codeword transmission.

17. The UE of claim 11, wherein the signaling comprises at least one of a DMRS configuration index, an MCS index and a number of physical resource blocks ($N_{PRB}$).

18. The UE of claim 11, wherein the DCI is a downlink (DL) assignment DCI corresponding to a physical downlink shared channel (PDSCH) transmission.

19. The UE of claim 11, wherein the DCI is an uplink (UL) assignment DCI corresponding to a physical uplink shared channel (PUSCH) transmission.

20. The UE of claim 19, further comprising instructions executable to:
    encode a PUSCH transmission based on the DMRS configuration; and
    send the PUSCH transmission.

21. A method for demodulation reference signal (DMRS) selection by an evolved Node B (eNB), comprising:
    determining a DMRS configuration;
    determining downlink control information (DCI), wherein the DCI comprises signaling that indicates a modulation and coding scheme (MCS) index and the MCS index is used to specify a modulation order and the DMRS configuration; and
    sending the DCI.

22. The method of claim 21, wherein determining the DMRS configuration comprises determining a DMRS configuration index based on the MCS, wherein the DMRS configuration is determined based on the DMRS configuration index.

23. The method of claim 21, wherein determining the DMRS configuration comprises determining an MCS index and a number of physical resource blocks ($N_{PRB}$), wherein the DMRS configuration is determined based on the MCS index and the $N_{PRB}$.

24. The method of claim 21, wherein the signaling comprises at least one of a DMRS configuration index, an MCS index and a number of physical resource blocks ($N_{PRB}$).

25. A method for demodulation reference signal (DMRS) selection by a user equipment (UE), comprising:
    receiving downlink control information (DCI);
    obtaining signaling from the DCI that indicates a modulation and coding scheme (MCS) index, wherein the MCS index is used to specify a modulation order and the DMRS configuration; and
    determining the DMRS configuration based on the signaling.

26. The method of claim 25, wherein determining the DMRS configuration comprises determining a DMRS configuration index based on the DCI, wherein the DMRS configuration is determined based on the DMRS configuration index.

27. The method of claim 25, wherein determining the DMRS configuration comprises determining an MCS index and a number of physical resource blocks ($N_{PRB}$), wherein the DMRS configuration is determined based on the MCS index and the $N_{pRB}$.

28. The method of claim 25, wherein the signaling comprises at least one of a DMRS configuration index, an MCS index and a number of physical resource blocks ($N_{PRB}$).

\* \* \* \* \*